United States Patent Office 3,566,576
Patented Mar. 2, 1971

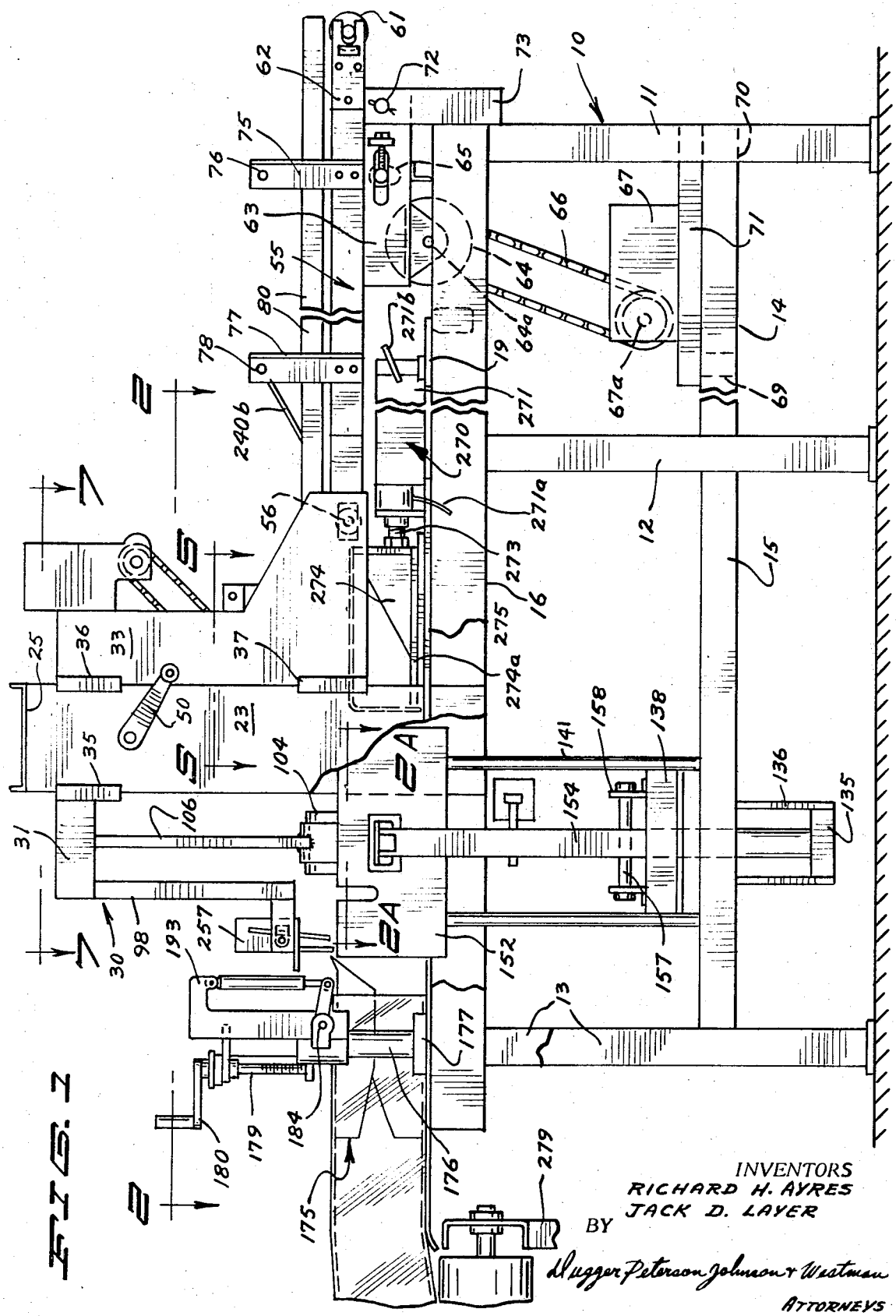

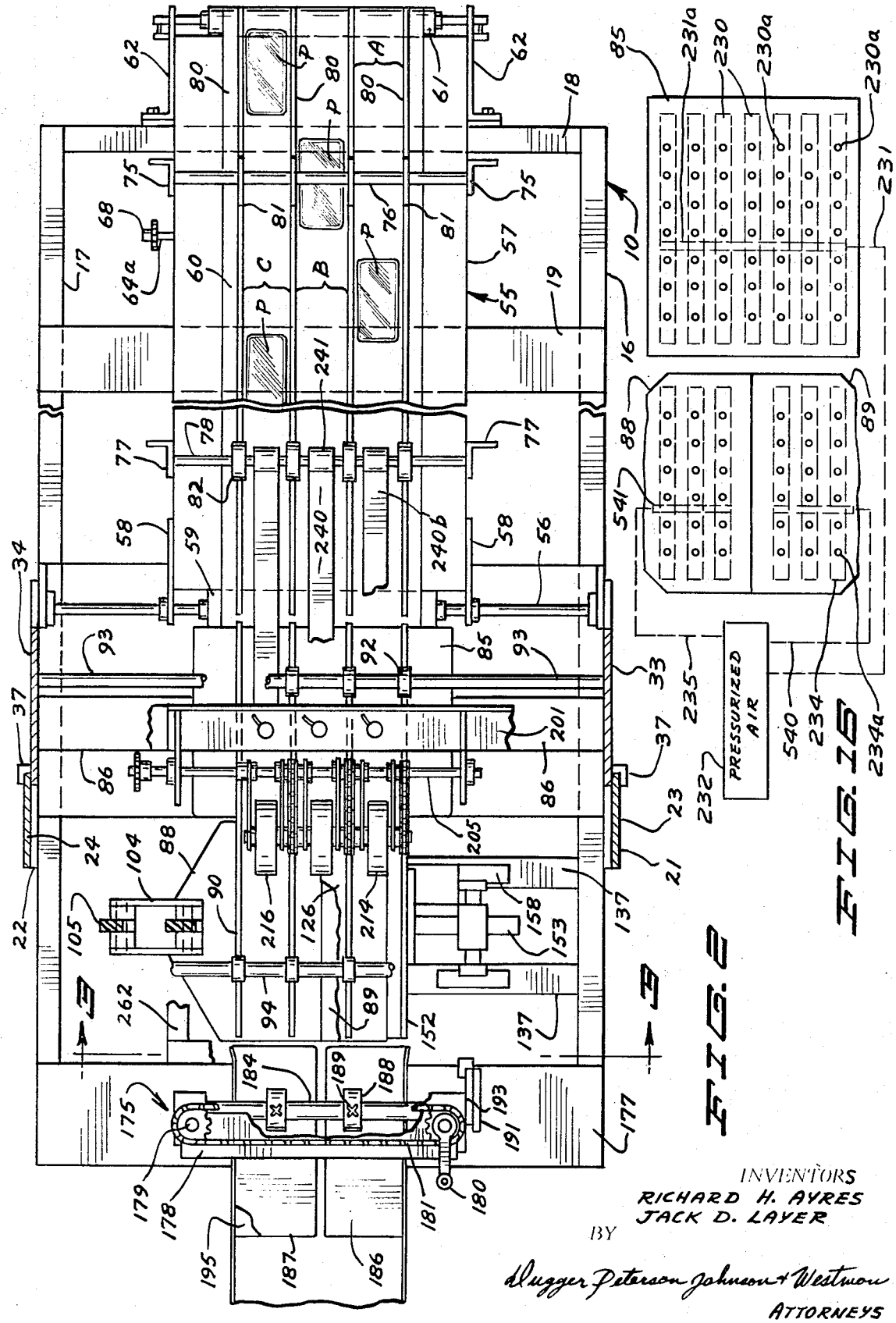

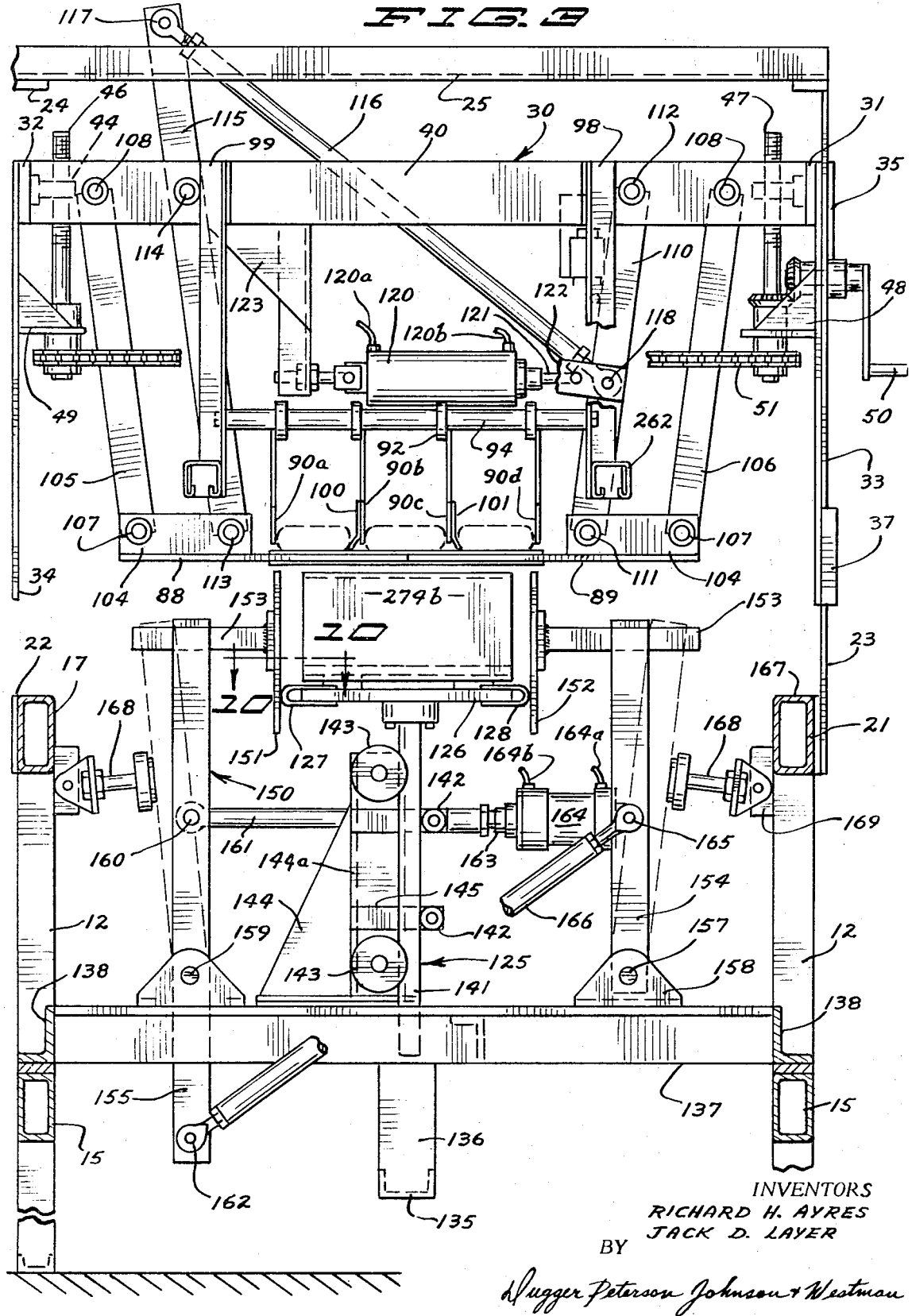

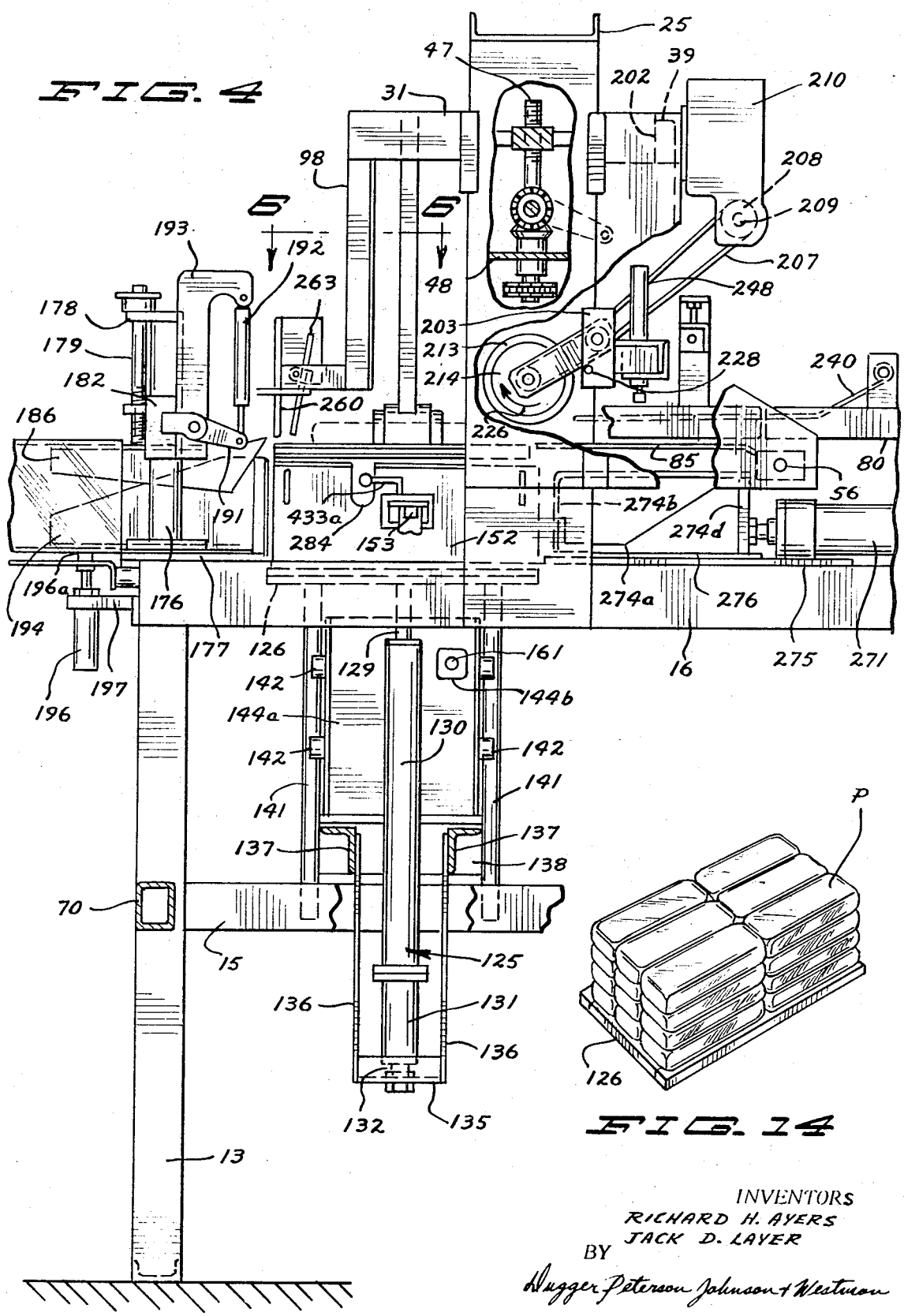

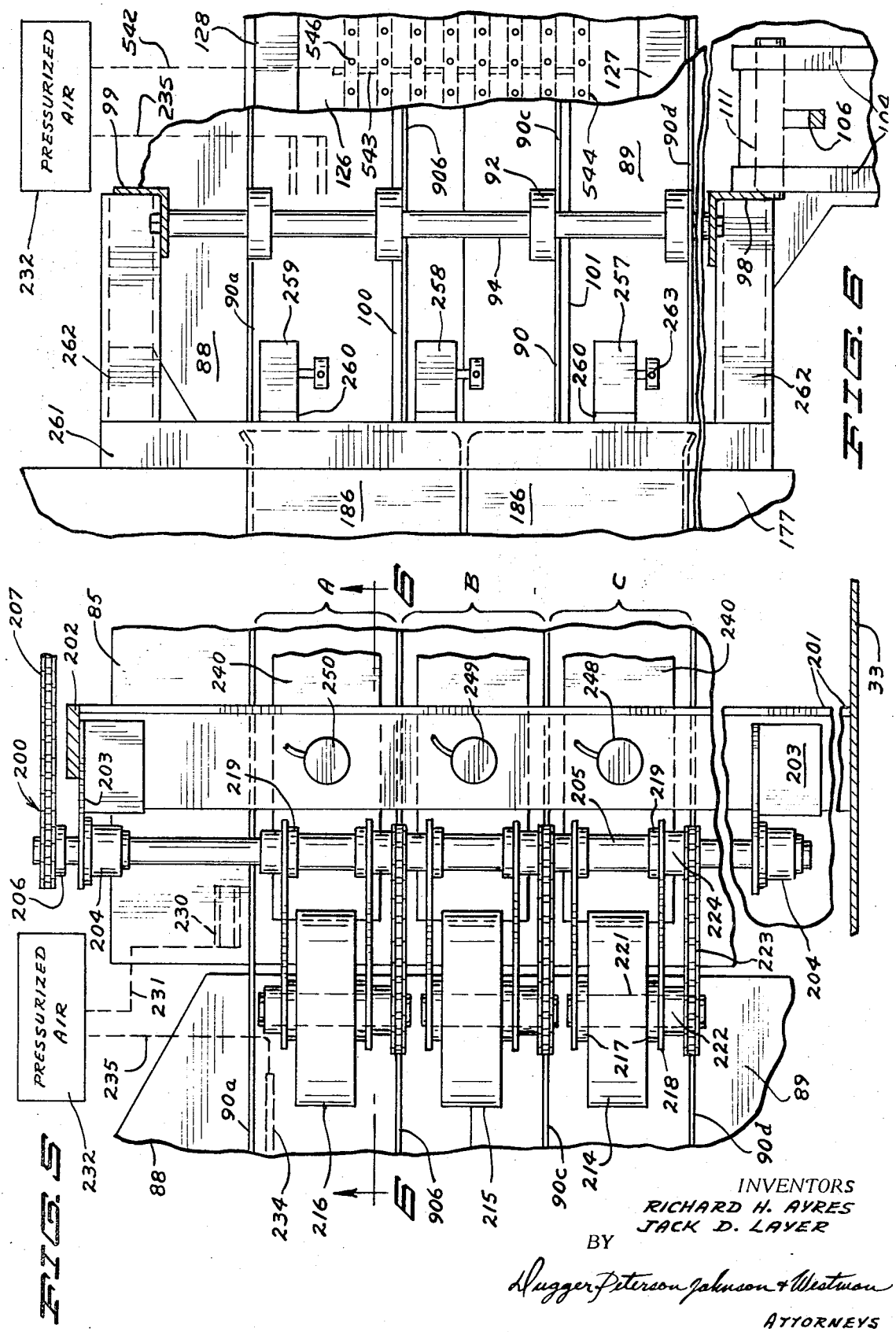

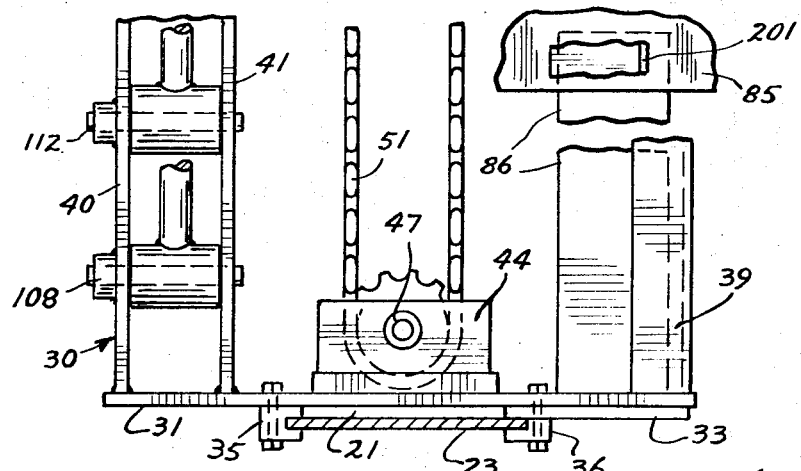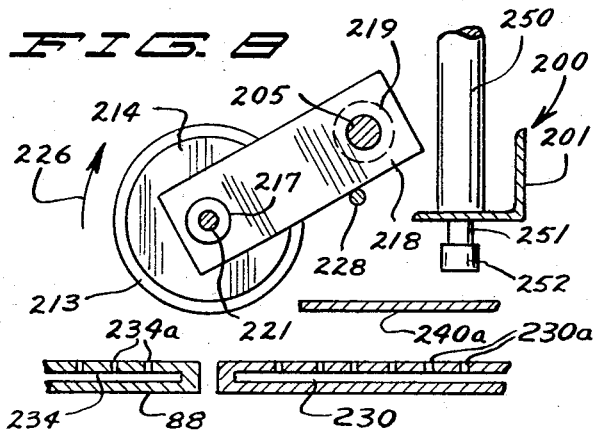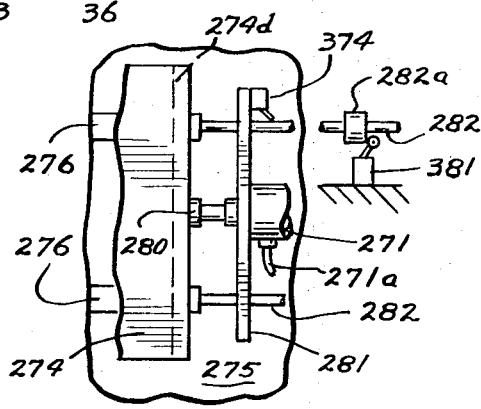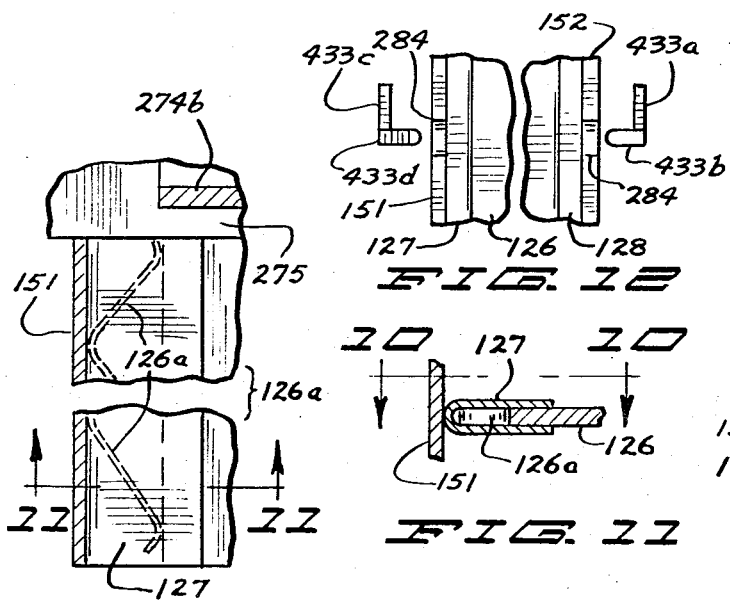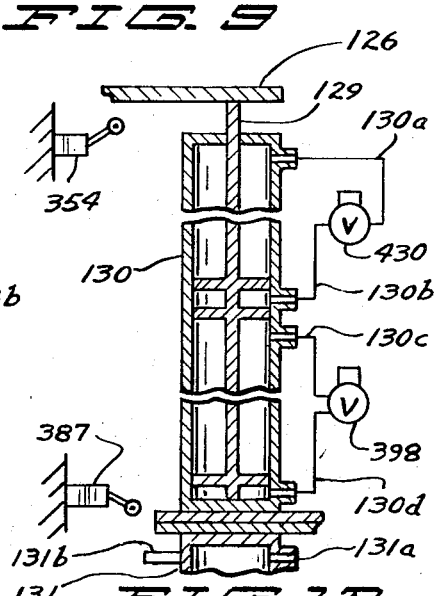

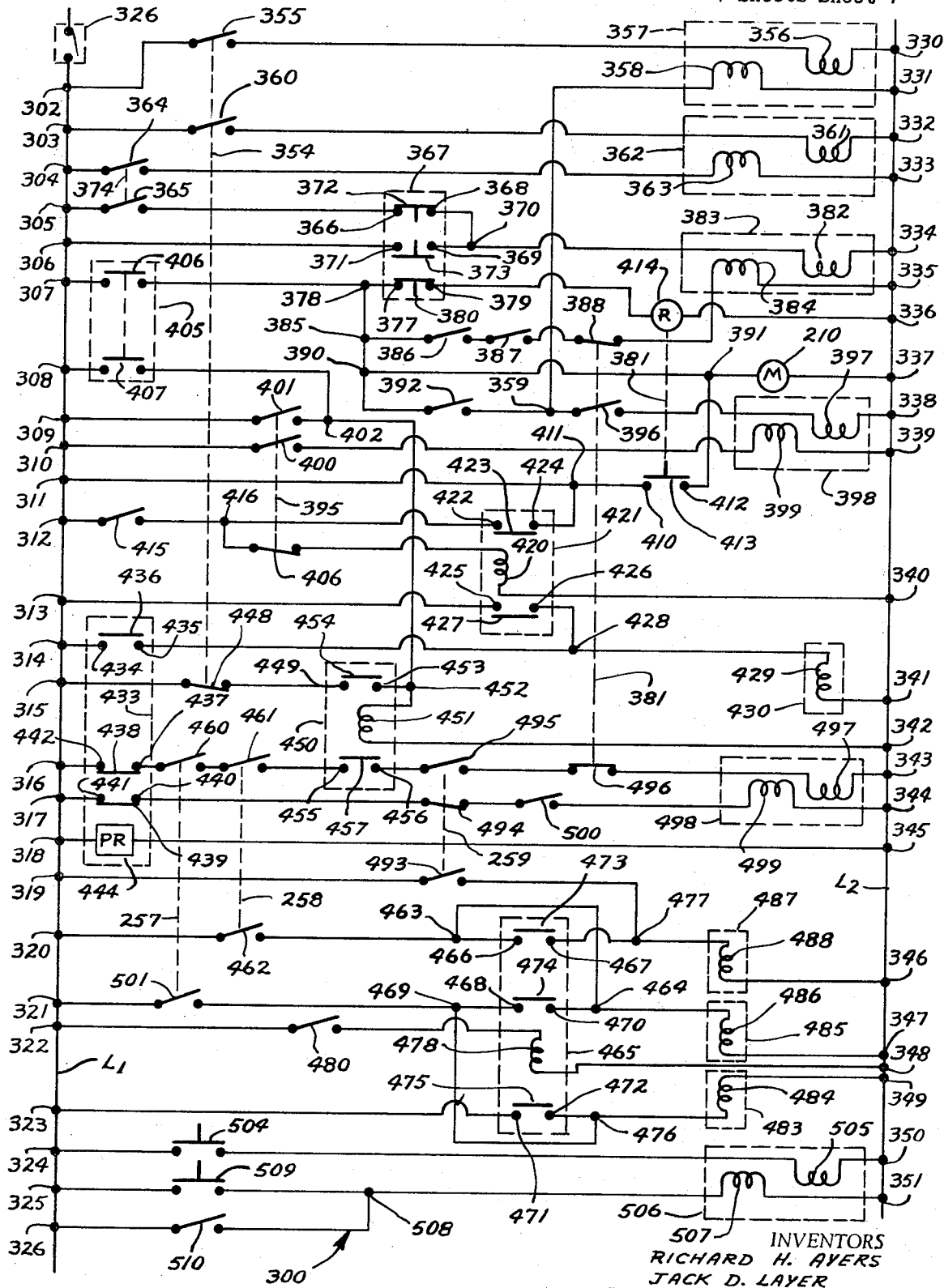

3,566,576
BALER LOADER APPARATUS
Richard H. Ayres and Jack D. Layer, Minneapolis, Minn., assignors to Bemis Company, Inc., Minneapolis, Minn.
Filed Mar. 17, 1969, Ser. No. 807,787
Int. Cl. B65b 35/50, 57/10
U.S. Cl. 53—61
44 Claims

ABSTRACT OF THE DISCLOSURE

Baler loader apparatus having a vertically adjustable carrier assembly mounted on a frame, product containing bag transfer and blocking mechanism on the carrier assembly for transferring bags from the respective lane of the conveyor that is in part supported by said assembly to the collector plates and alternately blocking such transfer, and means on said assembly to translate the collector plates to a spread apart condition to deposit a layer of arranged product receiving bags on the stacking platform therebeneath. The stacking platform is lowered with each new layer of bags deposited thereon until obtaining the desired number of layers and thence a ram is automatically operated to push the stacked layers through a spout into a baler bag.

FIELD OF INVENTION

The invention is directed to apparatus for receiving product containing bags, arraying a plurality of said bags, sequentially, depositing one or more layers of arranged bags on a stacking platform and pushing the layers of bags into a baler bag.

SUMMARY OF THE INVENTION

Baler loader apparatus having product containing bag support mechanism for receiving bags from a plurality of lanes and then depositing an array layer of bags on a stacking platform, mechanism to lower the platform after each layer of bags and mechanism automatically operated for pushing the arrayed layers of bags into a baler bag. One of the objects of this invention is to provide in baler loader apparatus having a plurality of lanes, new and novel mechanism for transferring a desired number of bags in each lane onto collector plates and automatically discontinue feeding bags in each lane as the desired number of bags have been transferred to the collector plates until each lane has the desired number of bags therein and the collector plates have been emptied of bags. Another object of this invention is to provide new and novel mechanism for automatically lowering as each new layer of product containing bags are deposited thereon, and after the desired number of bags have been deposited automatically move the layers of bags into a baler bag. In furtherance of the last mentioned object, it is an object of this invention to provide new and novel mechanism for automatically moving the stacking platform on which layers of bags are deposited to a given elevation after the last of desired layers of bags are thereon and prior to moving the layers of bags off the platform, provided the platform is not at said elevation. Still another object of this invention is to provide horizontally translatable mechanism to receive a plurality of rows of bags and with the bags in an arrayed condition, act in cooperation with dividers for said rows to drop the rows of bags in generally the same arrayed condition onto a stacking platform.

BRIEF DESCRIPTION OF THE DRAWINGS

FIG. 1 is a side elevational view of the baler loader apparatus of this invention, portions of said view being broken away;

FIG. 2 is a horizontal view of the apparatus of FIG. 1 that is for the most part taken along the line and in the direction of the arrows 2—2 of FIG. 1, and in part taken along the line and in the direction of arrows 2A—2A of FIG. 1, portions of said view being broken away;

FIG. 3 is a cross sectional view generally taken along the line and in the direction of the arrows 3—3 of FIG. 2, said view showing the side plate arms in a datum position in dotted lines and in a product containing bag compress position in solid lines;

FIG. 4 is a fragmentary enlarged view of the rear end portion of the structure illustrated in FIG. 1 with portions of the structure being broken away at different locations than that illustrated in FIG. 1;

FIG. 5 is an enlarged horizontal view generally taken along the line and in the direction of the arrows 5—5 of FIG. 1 that illustrates structure for feeding bags onto the collector plates and structure to block feeding bags onto the collector plates;

FIG. 6 is an enlarged fragmentary plan view generally taken along the line and in the direction of the arrows 6—6 of FIG. 4 to show portions of the transfer plate, collector plates, and the mounting of the sensing mechanism for determining that each lane over the collector plates has the proper number of bags thereon, parts being broken away;

FIG. 7 is an enlarged view generally taken along the line and in the direction of the arrows 7—7 of FIG. 1 to in part show the mounting of the collector plate arms, and the location of various structural parts one relative the other, various portions being taken away;

FIG. 8 is an enlarged vertical cross sectional view generally taken along the line and in the direction of the arrows 8—8 of FIG. 5;

FIG. 9 is a fragmentary plan view illustrating a portion of the ram mechanism in a datum position;

FIG. 10 is an enlarged fragmentary view showing the provision of a stacking platform extension on the stacking plate and a part of the ram, said view being generally taken along the lines and in the direction of the arrows 10—10 of FIGS. 3 and 11 with the side plate being in a bag noncompress position;

FIG. 11 is a fragmentary vertical cross sectional view generally taken along the line and in the direction of the arrows 11—11 of FIG. 10;

FIG. 12 is a fragmentary diagrammatic plan view of the stacking platform and side plates to show the location of the photoelectric unit light emitting and light receiving mechanism relative the side plates, the central portion of the stacking platform being broken away;

FIG. 13 is a fragmentary, somewhat diagrammatic, vertical cross sectional view of the stacking platform piston cylinder mechanism and the upper portion of the tandem cylinder;

FIG. 14 is a perspective view showing a plurality of layers of product receiving bags on the stacking platform;

FIG. 15 is a schematic showing of the electrical circuitry and controls for the apparatus of this invention; and FIG. 16 is a diagrammatic showing of the collector plates and the transfer plate to illustrate the air slide feature of said plates.

DESCRIPTION OF THE PREFERRED EMBODIMENT

Referring now in particular to FIGS. 1 and 2, the apparatus of this invention includes a longitudinally elongated frame, generally designated 10, having a pair each of transversely spaced front uprights 11, intermediate uprights 12, and rear uprights 13. Each of a pair of bottom longitudinal frame members 14 at one end is joined to the adjacent upright 12 and at the opposite end to the adjacent upright 11, while each of a pair of upper longitudinal frame members 15 are joined at one end to the adjacent upright 12 and at the opposite end to the adjacent upright 13. A longitudinally elongated top frame member 17 is welded to the upper ends of one set of uprights 11–13 while a corresponding top frame member 17 is likewise welded to the upper ends of the other set of uprights 11–13. A top transverse frame member 18 is joined to the front ends of frame members 16, 17 while a transverse plate 19 is welded to the top frame members a substantial distance rearwardly of frame member 18.

To each of the frame members 16, 17 at a location longitudinally intermediate uprights 12, 13 there is welded plates 21, 22 respectively (also see FIGS. 3 and 7). Plate 21 mounts an upwardly extending frame plate 23 while plate 22 mounts a corresponding frame plate 24; plates 23, 24 having upper flanged ends to which there is secured the respective ends of a transverse frame member 25.

Mounted for limited vertical movement by frame plates 23, 24 is a carrier assembly, generally designated 30, that includes transversely spaced, short longitudinal braces 31, 32. Attached to brace 31 to move therewith and depend therefrom is a mounting plate 33, plate 33 being located intermediate brace 31 and plate 23. Likewise, a second mounting plate 34 is attached to brace 32 to be located intermediate brace 32 and plate 24. A U-shaped guide bracket 35 is bolted to each of plates 31, 32 to have the respective vertical edge portion of the adjacent plates 23, 24 extend thereinto while vertically spaced guide brackets 36, 37 are secured to the respective mounting plate 33, 34 to abut against the opposite vertical edge portion of the adjacent mounting plate. Guide brackets 35–37 permit the carrier assembly being moved vertically while at the same time prevent it twisting relative plates 23, 24.

An angle bracket 39 extends between and is joined to the front end portions of braces 31, 32 while a pair of longitudinally spaced, transverse bars 40, 41 extend between and are mounted by the rear end portions of braces 31, 32. The intermediate portions of each of brace 31, 32 mounts a block 44, the blocks 44 respectively having screw shafts 47, 46 threaded therethrough such that the blocks will move vertically when the screw shafts are rotated. The screw shaft 46 is mounted by a bearing member 49 which in turn is fixedly attached to plate 24 such that the screw shaft may rotate relative thereto but cannot move axially relative the plate 24. Likewise, a bearing member 48 is mounted on plate 23 and mounts the screw shaft 47. A hand crank 50 is mounted by plate 23 and has a beveled gear that rotates a beveled gear mounted on shaft 47 when the hand crank is rotated so that the screw shaft 47 will rotate. The lower ends of shafts 46, 47 are connected together by a chain, sprocket arrangement 51 whereby the rotation of shaft 47 will rotate shaft 46 in the same direction and equal angular increments. As a result, by rotating the hand crank 50 in the appropriate direction, the carrier assembly may be moved (within limits) vertically in either an upward or downward direction relative frame members 16, 17.

In order to mount the rearward end of the conveyor assembly, generally designated 55, a transverse shaft 56 has its opposite ends mounted by the lower forward corner portions of the adjacent carrier assembly plates 33, 34 to move therewith. The rear end of the conveyor table 57 has brackets 58 mounted thereon, the rear portions of the brackets mounting bearing members through which the shaft 56 is extended to permit pivotal movement of the table relative the shaft. Intermediate the brackets 58, the shaft 56 rotatably mounts a transverse roller 59 which has the conveyor belt 60 extended therearound. The forward end of the conveyor table mounts a pair of brackets 62 which in turn journals the front conveyor roller 61.

A pair of transversely spaced bracket members 63 are dependingly secured to the conveyor table, said bracket members journaling for rotation of a driven conveyor belt roller 64. A belt tensioning roller 65 is also mounted by bracket members 63. Thus, the conveyor belt has an upper run that extends over the top of the conveyor table rearwardly from roller 61, thence the belt is reversely bent over roller 59, then forwardly to extend partly around roller 65, next rearwardly to extend partially around roller 64, and thence forwardly to roller 61. Roller 64 has a shaft 64a that has a sprocket 68 keyed thereto, a chain 66 being extended around sprocket 68 and a sprocket (not shown) keyed to the motor shaft 67a of the motor 67. The motor 67 is mounted on a mounting member 71 which in turn is mounted on transverse frame members 69, 70. Frame members 69, 70 are mounted by longitudinal frame members 14. A transverse shaft 72 is mounted by a pair of brackets 73 that are welded to the frame member 18 to extend thereabove. The shaft 72 is pivotally extended through slots (not shown) in the forward end portions of bracket members 63 whereby the conveyor table may be pivoted about the axis of shaft 72. Through the rearward end portion of the conveyor table being pivotally connected to the carrier assembly and the forward end portion of the conveyor table being pivotally connected to the shaft 72, the angle of inclination of the conveyor table (also the upper run of the conveyor belt) may be varied between angles extending downwardly and rearwardly condition, to a horizontal condition, and extending upwardly and rearwardly by varying the elevation of the carrier assembly through turning crank 50.

In order to provide a plurality of lanes on the conveyor belt, for example three separate lanes A, B, C as shown, a pair of angle brackets 75 have their lower ends bolted to the forward end portion of the conveyor table, the upper ends of said angle brackets mounting a shaft 76. Likewise, a pair of angle brackets 77 have their lower ends bolted to the rearward end portion of the conveyor table, the upper ends of said brackets mounting a shaft 78. There are provided a plurality of lane plates 80 (one more lane plate than the number of lanes to be provided). Each lane plate has a mounting member 81 secured thereto to extend thereabove, the mounting member having the shaft 76 extended therethrough. A set screw (not shown) is provided in each mounting member 81 to retain the mounting member in a transverse adjusted position relative the shaft 76. Likewise, each lane plate 80 has a mounting member 82 through which the shaft 78 is extended, a set screw (not shown) being extended to the mounting member and bearing against the shaft 78 to retain the mounting member in a transverse adjusted condition. The mounting members support the lane plates 80 to have the lower edges of the lane plates adjacent and just above the upper run of the conveyor belt 60. The front ends of the mounting plates are in overhanging relationship to the roller 61 while the rearward end portions of the lane plates 80 terminate above roller 59.

To receive bags from the rearward end portion of the upper run of the conveyor belt, there is provided a generally horizontal transfer plate 85 that has a forward end portion depending slightly downwardly and terminating closely adjacent the belt as it passes over roller 59 (see FIGS. 2 and 4). To mount the transfer plate there is provided a pair of transversely elongated, transversely spaced blocks 86 that have their adjacent end portions secured to the transfer plate to have the edge portions of the transfer plate extend thereon, and their opposite end portions attached to plates 33, 34 respectively. The rear transverse edge of the transfer plate is located longitudinally adjacent the front edges of a pair of collector plates 88, 89 (see FIGS. 2 and 5).

In order to mount a plurality of lane plates 90 in the same transverse spaced relationship as lane plates 80 but to extend longitudinally rearwardly of the lane plates 80 in overhanging relationship to the collector plates and the transfer plate, there are provided a pair of longitudinally transverse shafts 93, 94. Each of the shafts mounts a plurality of lane plate mounting members 92 that depend from the respective shaft and is secured to the respective lane plate. Set screws (not shown) are threaded into the blocks 92 to abut against the respective shafts for retaining the plates 90 in transverse adjusted relationship. The shaft 93 has its end portions mounted by carrier assembly plates 33, 34 a short distance rearwardly of shaft 56 at a substantial distance vertically thereabove. Shaft 94 has one end attached to the lower end of an angle bracket 99 (see FIG. 3) while the opposite end of said shaft is attached to the lower end of angle bracket 98. The upper ends of the vertical angle brackets are attached to the carrier plate 40 on the opposite side from carrier plate 41.

In the event that, for example, three lanes are provided such as illustrated in the drawings, then to each of the two intermediate lane plates 90 on the opposite sides from one another (plates 90b, 90c) there is attached a flange plate 100, 101, respectively. The lower flange portions of plates 100, 101 diverge outwardly of one another in downward directions The purpose of providing these flange plates will be set forth hereinafter.

In order to mount the collector plates such that their adjacent edges in the datum position are in abutting relationship equally transversely spaced from lane plates 90b, 90c; and to translate the collector plates horizontally apart; to each of the opposed ends of the collector plates there is attached a pair of longitudinally spaced bars 104. Between the remote ends of each pair of bars 104 there is mounted the lower end of control arms 105, 106 respectively by pivot members 107, the upper end of said arms being extended between and connected to the carrier assembly plates 40, 41 by pivot members 108. For plate 89 there is provided a control arm 110 that at its lower end is connected to the adjacent bars 104 by a pivot member 111. The upper end of the control arm 110 is pivotally connected to carrier plates 40, 41 by a pivot member 112. A control arm 115 has its lower end pivotally connected to the adjacent bars 104 of collector plate 88 by a pivot member 113 while an intermediate portion of said arm is pivotally connected to carrier plates 40, 41 by pivot member 114. The upper end of the control arm 115, which extends above the carrier plates 40, 41, is pivotally connected to one end of a link rod 116 by a pivot member 117. The opposite end of rod 116 is pivotally connected by a pivot member 118 to the control arm 110 intermediate pivot members 111, 112. Thus arms 106, 110 and arms 105, 114 are respectively mounted in parallel relationship.

A piston cylinder combination 120, 121 has one end of the cylinder 120 pivotally connected to the lower end of a bracket 123, the upper end of the bracket being connected to carrier plate 40 intermediate pivot members 112, 114 and more closely adjacent pivot member 114. The piston rod 121 of the aforementioned piston cylinder combination is pivotally connected to a plate 122 that in turn is welded to control arm 110 adjacent pivot member 118. Through the provision of the aforementioned mounting of the piston cylinder combination and the link rod, upon applying air under pressure through line 120a to cylinder 120, the piston rod 121 moves whereby the arms connected to plates 88, 89 translate the plates away from one another at the same rate of speed while retaining the plates in the horizontal condition. Further, each plate is moved an equal amount but in opposite direction from its datum position.

Located directly beneath the collector plates in their datum position, and in a position to receive bags from the collector plate is a stacking plate assembly, generally designated 125 (see FIGS. 3 and 4). The stacking plate assembly comprises a stacking platform that includes a stacking plate 162 and a pair of stacking plate extensions 127, 128 which will be described hereinafter. The stacking plate 126 is mounted on the upper end of a piston rod 129 of an air-oil piston cylinder combination 129, 130. The lower end of the cylinder 130 of the aforementioned combination is fixedly attached to the end of an air tandem cylinder 131 of a piston cylinder combination that includes a piston rod 132 (see FIG. 4). The piston rod 132 is attached to the channel 135 whereby upon applying air under pressure through line 131a to the upper end of cylinder 131, the cylinders 130, 131 are moved vertically above channel 135. The opposite ends of channel 135 are welded to the lower ends of a pair of transversely spaced plates 136, the upper ends of each plate 136 being attached to a transverse angle iron 137. The angle irons 137 at each end are welded to an angle iron 138, each angle iron 138 being secured to the respective longitudinal frame member 15. Fixedly attached to the stacking plate to be located on opposite longitudinal sides of the cylinder 130 in depending relationship to the stacking plate are a pair of guide rods 141. The one side of each guide rod bears against a pair of vertically spaced rollers 142 while the opposite surface abuts against a pair of vertically spaced rollers 143. In order to mount the rollers 142, 143 there is provided a vertically elongated bracket 144 that in horizontal cross section has a U-shaped channel portion 144a. The bracket is mounted by angle irons 137.

The one leg of the channel portion 144a mounts a pair of the rollers 143 for one of the guide rods and a pair of vertically spaced bars 145. Each bar 145 mounts a roller 142. Likewise, the opposite leg of the channel portion mounts a pair of rollers 143 and a pair of bars 145 that in turn mount rollers 142.

In order that the bags on the stacking platform do not exceed the width of the baler bag in which the stacked bags are to be pushed, there is provided a pusher plate assembly, generally designated 150. The pusher plate assembly includes a vertical pusher plate 151 located on one transverse side of the stacking platform and a pusher plate 152 located on the opposite transverse side. In order to mount and move the pusher plates, a bar 153 is attached to each pusher plate to extend transversely away therefrom. Each bar is extended through an opening provided in the upper end of the respective arm 154, 155, there being provided a set screw (not shown) to retain the respective bar 153 in a transverse adjusted position. The lower end of arm 154 is pivotally mounted on a pivot member 157 which in turn is mounted by mounts 158. The mounts 158 in turn are mounted on angle irons 137. The lower intermediate portion of arm 155 is mounted by a pivot member 159 which in turn at either end is mounted by mounts 158 that are secured to adjacent angle irons 137. A pivot member 160 is mounted by arm 155 vertically intermediate pivot member 159 and bar 153, pivot member 160 pivotally mounting one end of a rod 161. The rod 161 extends through aperture 144b in channel portion 144a, the opposite end of rod 161 being connected to the one end of a piston rod 163 of a piston cylinder combination that includes a cylinder 164 so that rod 161 is not movable relative the piston rod. The cylinder 164 is pivotally connected at 165 to a vertically intermediate portion of arm 154. A control link 166 at one end is pivotally mounted by pivot member 165 and at the opposite end is pivotally connected at 162 to the lower end of arm 155. Through the provision of members 160–162, 163–166, upon applying air under pressure through line 164a to the cylinder 164, the upper ends of arms 154, 155 are moved equal amounts in opposite directions about their respective pivots 157, 159. In order to limit the spread apart movement of the arms 154, 155, a stop 168 is mounted by a bracket 169 that in turn is mounted by frame members 16. Likewise, a second stop 168 is mounted by a bracket 169 that is secured to frame member 17, the stops being in position to limit the outer movement of the adjacent arm 154, 155.

Each of the stacking plate extensions 127, 128 has a reversely bent intermediate portion abutting against the side plates 151, 152 respectively and legs slidably extended over the top and bottom surfaces of the stacking plate in both the side plates spread apart position and the product containing bag compress position. In the side part spread apart condition, the extensions partly underlay the positions of outer rows of bags whereby when the extensions are moved toward one another, they do not damage the bags. A spring steel member 126a is mounted by each extension between the extension reversely bent portion and the adjacent edge of the stacking plate to resiliently retain the extension in abutting relationship with the adjacent side plate. Through the provision of the extensions, no gaps are provided between the stacking plate and the side plates in the spread apart position, but at the same time the side plates may be moved transversely toward one another to transversely compress the bags on the stacking platform.

In order to facilitate the movement of stacked bags off the stacking platform into a baler bag there is provided a spout assembly, generally designated 175 (see FIGS. 1, 2 and 6). The spout assembly includes a pair of transversely spaced vertical rods 176 that are mounted by a transverse plate 177 that is secured to the rear ends of frame members 16, 17. A transverse plate 178 is attached to the upper ends of both rods 176, plate 178 rotatably mounting a pair of transversely spaced shafts 179 at a fixed vertical elevation. The lower end of shafts 179 are threaded and are threadedly extended through an appropriate threaded aperture in a lug welded to the adjacent block 182, each block 182 being slidably mounted on one of the posts 176. A hand crank 180 is keyed to one of the shafts 179 while a chain and sprocket arrangement 181 is provided on the shafts 179 whereby rotating the hand crank 180 in one direction will cause both shafts 179 to rotate equal angular increments whereby the blocks 182 are moved vertically.

A transversely extending bar 184 that throughout most of its length is rectangular in vertical longitudinal cross section has its opposite stud shaft ends pivotally mounted by blocks 182. Mounted on the bar 184 are a pair of upper spout sections 186, 187, each spout section having a block 188 that is secured thereto and has the bar 184 extended therethrough. A member 189 is threaded through each block 188 to retain the upper spout sections in a transverse adjusted position.

In order to move the upper spout sections between a baler bag holding position and a bag loading position, one end of an arm 191 is keyed to one stud shaft end portion of bar 184. The opposite end of the arm is pivotally connected to the piston rod of a piston cylinder combination 192, the cylinder of said combination being pivotally connected to a short leg of a generally J-shaped bracket 193. The other leg of bracket 193 is welded to one of the blocks 182.

The spout also includes a pair of lower sections 194, 195 that are mounted by plate 177. The spout sections 194, 195 are mounted by plate 177 by means (not shown) to permit the transverse spacing of the lower spout sections to be varied. Transversely spaced piston cylinder combinations 196 have cylinders mounted by brackets 197 that are attached to the frame whereby upon applying air under pressure to the lower ends of the cylinders, the piston rods will move feet 196a to retain the baler bag side wall in a clamped position against the adjacent spout section 194, 195. The spout sections in transverse vertical cross section provide a generally rectangular opening through which the product receiving bags may be pushed into the baler bag retained thereon.

In order to facilitate movement of the bags from the transfer plate to the collector plates and to block movement of the bags rearwardly onto the collector plates there is provided a feed roller and blocking assembly generally designated 200 (see FIGS. 4, 5 and 8). The assembly 200 includes a transverse angle iron 201 that at one end is attached to carrier plate 33 and at the opposite end is attached to the lower end of an upright 202. The upper end of upright 202 is secured to angle iron 39. A pair of transversely spaced brackets 203 are mounted on angle iron 201, each of said brackets mounting a bearing member 204. The bearing members 204 rotatably mount a transverse shaft 205 which at one end has a sprocket 206 keyed thereto. The sprocket 206 is driven by chain 207 which in turn is driven by a sprocket 208 that is keyed on the motor shaft 209 of the motor 210. The motor 210 is mounted on angle iron 39.

For each lane provided there is provided a feed roller; and assuming that there are three lanes such as illustrated there are provided feed rollers 214, 215 and 216. Each of the feed rollers has a rubber coated surface portion 213. Each of the rollers is keyed to a stud shaft 221 to rotate therewith, each shaft 221 being rotatably mounted by a pair of bearing members 217. Each bearing member 217 is mounted by one end portion of an arm 218, the opposite end of each arm mounting a bearing member 219 that is in turn mounted on shaft 205. Through the provision of the bearing member 219, the shaft 205 may rotate without the arms 218 being rotated.

On one end portion of each shaft 221 there is keyed a sprocket 222 that is driven by a chain 223. Each chain 223 is driven by a sprocket 224 that is keyed on shaft 205 to be driven thereby. Through the aforementioned structure, each of the feed rollers is continuously driven in the direction of the arrow 226; the weight of the feed rollers preventing the rotation of the shaft 205 elevating the feed rollers. To limit the downward movement of the feed rollers, there is provided a transverse shaft 228 that has its opposite ends mounted by brackets 203 to extend into underlying relationship with arms 218. Through the provision of rod 228 the downward movement of the feed rollers 214–216 is limited so that the feed rollers do not engage the transfer plate or collector plates.

In order to facilitate the movement of bags over the transfer plate 85, the transfer plate is provided with a plurality of longitudinally extending fluid passageways 230 that open to a transversely extending fluid passageway 231a (see FIGS. 5 and 16). Opening through the top surface of the transfer plate and opening to the passageways 230 are spaced apertures 230a for directing the flow of air upwardly, passageway 231a being connected to a source of pressurized air 232 by a line 231. Likewise, each of the collector plates is provided with a plurality of longitudinally fluid passageways 234 that open to a transverse passageway 541, the passageway 541 of plate 89 being connected by a flexible line 540 to source 232 and passageway 541 of plate 88 being connected by a flexible line 235 to source 232. Each collector plate has a plurality of apertures 234a opening to passageways 541 and through the top surface of the respective plate. Similarly the stacking plate 126 has a plurality of apertures 544 opening through the top surface thereof and to the longitudinally extending passageways 544 which are connected together by a transverse passageway 543. Passageway 543 is connected by a flexible line 542 to source 232. The apertures are scattered throughout the major portions of the respective plates 88, 89, 85 and 126 whereby the plates provide air slides to permit bags being readily moved thereover. As a result a very small amount of force is required to move a bag longttudinally over the respective plate. During the time the machine is operating the source 232 is continuously connected to the passageways in the above mentioned plates to provide a continuous discharge of air in an upward direction.

In order to block the movement of a bag to the feed roller in the respective lane, there is provided a flexible metal plate 240 in each lane. The forward inclined end portion 240b of each plate extends downwardly in a rearward direction, the remaining portion 240a of each plate in a non blocking position extending nearly parallel to the transfer plate. Each plate 240 rearward end portion 240a terminates longitudinally adjacent and forward of the respective feed wheel. The forward end portion of each plate 240 is mounted by a block 241 such that the rearward portion 240a is normally maintained at a height above the transfer plate that is greater than the thickness of the bag that is to pass therebeneath. Each of the blocks 241 is mounted on the shaft 78, there being provided a set screw (not shown) for retaining each block in a proper angular position whereby the rearward portion of the plate 240 is maintained above the transfer plate as previously described.

For each lane, there is provided a foot cylinder combination, the foot cylinder combination including cylinders 248, 249 and 250 mounted on the angle iron 201 with one cylinder being above each lane. Each foot cylinder combination also includes a piston rod 251 extended through an aperture (not shown) in the angle iron 201, the lower end of each piston rod mounting a rubber foot 252. Upon applying air under pressure to the upper ends of foot cylinders, the respective piston rod is moved downwardly whereby the rubber feet 252 force the rearward portion 240a of the adjacent flexible plate 240 downwardly a sufficient amount to prevent the passage of a bag rearwardly between the plate 240 and the transfer plate. When no air under pressure is applied to the upper end of the foot cylinder, the piston of the respective cylinder is returned to a retracted datum position by an internal spring (not shown).

In order to control the application of air under pressure and other operations there is provided a sensing switch for each lane (see FIGS. 1, 5 and 7), the sensing switches 257, 258 and 259 each being mounted on the upper end portion of a vertical plate 260. The plates 260 are welded in transverse spaced relationship to a transverse bar 261 that at either end has a longitudinally extending tab extending under and welded to the one end portion of the adjacent channel 262. The opposite end of one of the channels 262 is welded to angle iron 98 while the opposite end of the other channel is welded to the angle iron 99. By the above mentioned structure, the sensing switches are supported in overhanging relationship to the collector plates in positions longitudinally adjacent the forward end of the spout sections. Each of the sensing switches includes a pivotally mounted sensing rod 263 that extends downwardly into the respective lane in a position to be moved by a bag being moved on the respective collector plate to a location closely adjacent the rear transverse edge of the collector plate. The lower end portions of plates 260 extend beneath bar 261 to positions sufficiently adjacent the collector plates to stop rearward movement of bags over the collector plates, the plates 260 being above the rearward edge portions of the collector plates.

In order to move the stacked bags off the stacking platform when said platform is in a datum position and through the spout into a baler bag being retained on the spout, there is provided a ram assembly, generally designated 270. The ram assembly comprises a piston cylinder combination, said combination including a cylinder 271 that has its forward end mounted on plate 19. The rear end portion of the cylinder is supported by a plate 275 that at its opposite ends is welded to the top surfaces of frame members 16, 17. The ram piston rod 280 is slidably extended through a transfer plate 281 that is mounted on plate 275. Provided on the plate 275 are a pair of transversely spaced rails 276 on which the bottom plate 274a of the ram head 274 bears in the ram retracted datum position. The ram head includes a transverse vertical rear pusher plate 274b and a vertical, transverse front plate 274d that have upper edges at a lower elevation than the collector plates and vertical edges that are transversely spaced less than the transverse width of the stacking plate. The bottom edges of the bottom plate 274a and rear pusher plate 274b are at an elevation to ride over the stacking platform when the stacking platform is in the datum position. The length of the stroke of the piston rod of the cylinder 271 is sufficiently great to move the pusher plate 274b from the datum position illustrated in FIGS. 1 and 4 to a location rearwardly of the rearward edges of the spout sections, i.e. to push a filled baler bag onto the conveyor 279 that is partly illustrated in FIG. 1. Attached to the front ram plate 274d on either transverse side of the piston rod 280 and slidably extended through plate 281 are a pair of guide rods 282.

Each of the side plates is provided with a vertical notch 284 that is transversely opposite the other notch, the notches being located longitudinally intermediate the vertical edges of the side plates and opening through the top edges of said plates. Mounted on the arm 153 by mechanism (not shown) for selected vertical adjustment is a bracket 433c that in turn mounts a photoelectric light receiving member 433d of the photoelectric unit 433. Unit 433 also includes a photoelectric light emitting member 433b that is mounted by a bracket 433a. Bracket 433a is mounted for limited vertical adjustment on arm 153 by mechanism not shown. Members 433b, 433d are mounted at the same elevation whereby member 433b can transmit a beam of light through notch 284 to member 433c, members 433b, 433d being mounted to transmit a beam of light that would be broken by a product containing bag on the stacking platform until the stacking platform was lowered relative the collector plates whereby the top surface of such a bag was spaced from the bottom surface of the stacking platform by a dimension slightly greater than the thickness of the said bag.

Referring now to FIG. 15, the control circuitry and components, generally designated 300, will now be described. The circuitry 300 includes main lines $L_1$ and $L_2$, line $L_1$ having junctions 302 through 326 inclusive thereon. An on-off switch 326 connects junction 302 to a suitable source of power. Line $L_2$ which is also connected to the source of power has junctions 330 through 351 inclusive thereon. Connected in series across junctions 302 and 330 is a normally open first switch member 355 of the bale compress and tandam cylinder up limit switch 354 and the tandem cylinder up solenoid coil 356 of a solenoid operated tandem cylinder air valve 357. Valve 357 includes a tandem cylinder down solenoid 358 that is connected across junctions 331 and 359.

A normally open second switch member 360 of the limit switch 354 and the bale compress close solenoid coil 361 of the solenoid operated bale compress air valve 362 are connected in series across junctions 303 and 332. Valve 362 includes a bale compress open solenoid coil 363 that together with the normally open switch member 364 of the ram reverse limit switch 374 are connected in series across junctions 304, 333. The ram reverse limit switch also includes a normally open switch member 365 that is connected across junction 305 and the first terminal 366 of a cancel switch 367. A second terminal 368 of the cancel switch and a third terminal 369 are connected to a junction 370 while a fourth terminal 371 is connected to junction 306. The cancel switch includes a normally closed switch member 372 for electrically connecting terminals 366, 368 and a normally open switch member 373 that when the cancel switch is depressed electrically connects terminals 369, 371. The cancel switch also includes a fifth terminal 377 that is connected to junction 378, a sixth terminal 379, and a normally closed switch member 380 that electrically connects terminals 377, 379.

Connected across junctions 334, 370 is a ram reverse solenoid coil 382 of the solenoid operated ram valve 383, the ram valve including a ram rearward solenoid coil 384. Connected in series across junctions 335 and 385 are the aforementioned coil 384, a switch member 388 of the bale compress release limit switch 381, a normally open ram rearward and stacking platform up limit switch 387, and a normally open bag clamp limit switch 386; the junction 385 being connected by line to junctions 378 and 390. A tandem cylinder down switch 392 is connected across junctions 359, 390, junction 390 being connected by a line to junction 391. The feed roller motor 210 is connected across junctions 391, 337.

Connected in series across junctions 359, 338 is a switch member 396 of the bale compress release limit switch 381 and the stacking plate up solenoid coil 397 of the stacking plate solenoid operated air valve 398. Valve 398 includes a stacking plate down solenoid coil 399 that, together with the switch member 400 of the stacking plate down limit switch 395, are connected in series across junctions 310, 339. The last mentioned limit switch includes a second switch member 401 that is connected across junctions 309, 402 and a third switch member 403.

A manually operated start switch 405 has a first switch member 406 that upon manually depressing the start switch provides an electrical connection between junctions 307, 378 and a second switch member 407 that provides an electrical connection between junctions 308 and 402. Upon releasing the manual pressure on the start switch, switch members 406, 407 are resiliently moved (by means not shown) to open positions to break the electrical connections between the respective set junctions.

A first terminal 410 of motor starter is connected by lines to junction 411 and junction 311 while a second terminal 412 is connected by a line to junction 391. A normally open switch member 413 of the motor starter electrically connects terminals 410, 412 when the starter relay coil 414 is energized, the coil 414 being connected across terminal 379 and junction 336.

A normally open lock valve relay switch 415 is connected across junctions 312, 416, the switch member 403 of switch 395 and the solenoid coil 420 of the lock valve relay 421 being connected in series across junctions 416, 340. The relay 421 includes a first terminal 422 connected via a line to junction 416, a second terminal 424 connected via a line to junction 411 which in turn is connected by a line to junction 311, and a switch member 423 that upon energizing coil 420 electrically connects terminals 422, 424. The relay 421 also includes a third terminal 425 that is connected by a line to junction 313, a fourth terminal 426 that is connected by a line to junction 428 and a switch member 427 that upon coil 420 being energized electrically connects terminals 425, 426. Connected across junctions 341 and 428 is the coil 429 of the solenoid operated lock valve 430. The photoelectric unit 433 also has a first terminal 434 connected to junction 314, a second terminal 435 connected to junction 428, a third terminal 442 connected to junction 316, a fourth terminal 437, a fifth terminal 441 connected to junction 317, a sixth terminal 440, and switch members 436, 438 and 439. When the photoelectric beam is broken, the switch member 439 breaks the electrical connection between terminals 440, 441, the switch member 438 breaks the electrical connection terminals 437, 442, and the switch member 436 establishes an electrical connection between the terminals 434, 435; and upon reestablishing the continuity of the beam, the switch member 436 breaks and the switch members 438, 439 reestablishes the electrical connection between the respective set of terminals. The unit 433 also includes a photo eye amplifier 444 that is connected across junctions 318, 345.

A normally closed switch member 448 of the bale compress and tandem cylinder up limit switch 354 is connected across junction 315 and a first terminal 449 of the stacking plate relay 450, the relay including a solenoid coil 451 that is conected across junctions 342, 452. Junction 452 is connected by lines to junction 402 and a second terminal 453 of relay 450, relay 450 including a switch member 454 that electrically connects terminals 449, 452 when coil 451 is energized; a third terminal 455, a fourth terminal 456 and a switch member 457 that connects terminals 455, 456 when coil 451 is energized. The normally open switch member 460 of the lane sensing switch 257 and the normally open switch member 461 of the lane sensing switch 258 are connected in series across terminals 437, 455; while a second normally open switch member 462 of lane switch 258 is connected across junctions 320, 463. Junction 463 is connected by lines to junction 464 and to the first terminal 466 of the lane clamp cylinder relay 465. Relay 465 includes a second terminal 467 that is connected by a line to junction 477, third terminal 468 that is connected by a line to junction 469, a fourth terminal 470 that is connected by a line to junctions 464, a fifth terminal 471 that is connected by a line to junction 323, a sixth terminal 472 that is connected by a line to junction 476 and switch members 473, 474 and 475. Upon energizing the solenoid coil 478 of relay 465, switch member 475 moves to electrically connect terminals 471, 472; switch member 474 moves to electrically connect terminals 468, 470; and switch member 473 moves to electrically connect terminals 466, 467. The coil 478 and a normally open lane feed limit switch 480 are connected in series across junctions 322, 348.

There are provided three solenoid operated lane cylinder air valves 483, 485 and 487, there being one lane cylinder valve for each of the cylinders 248, 249 and 250 respectively. The solenoid coil 484 of valve 483 is connected across junctions 476, 349; the solenoid coil 486 of valve 485 is connected across junctions 464, 347; and the solenoid coil 488 of valve 487 is connected across junctions 477, 346.

The lane limit switch 259 has three switch members, one normally open switch member 493 being connected across junctions 319, 477; a normally closed switch member 494; and a normally open switch member 495 that together with the switch member 496 of the bale compress release limit switch 381 and the collector plate open solenoid coil 497 of the collector plates solenoid operated air valve 498 are connected in series across terminal 456 and junction 343. Valve 498 includes a collector plate open solenoid coil 499 that together with the normally open collector plate limit switch 500 and switch member 494 are connected in series across terminal 440 and junction 334.

The limit switch 257 has a normally open switch member 501 that is connected across junctions 321, 469, junction 469 being connected by a line to junction 476. A normally open, manually operated clamp switch 504 and the mouth clamp solenoid coil 505 of the solenoid operated mouth clamp air valve 506 are connected in series across junctions 324, 350. The valve 506 includes a mouth unclamp solenoid coil 507 that is connected across junctions 351, 508. Connected across junctions 325, 508 is a normally open, manually operated switch 509. Switches 504, 509 are the type that when they are not manually depressed they are in open condition. Connected across junctions 325 and 508 is a normally open mouth unclamp limit switch 510.

Each of the valves 483, 485 and 430 are the type that when their coils are de-energized, no fluid under pressure is applied to the cylinders 248, 249 and 250 respectively, but rather these cylinders are connected to exhaust ports (not shown) of the respective valve. Further, valve 430 is of the type that when coil 429 is de-energized, fluid under pressure cannot pass therethrough. As to each of the valves 357, 362, 383, 498 and 506, these are the type that when one of the respective coils has been energized, the operating member (not shown) of the respective valve is moved to apply fluid under pressure to one end of the cylinder to which it is fluidly connected and exhaust the other end; and when the second solenoid coil of the respective valve is energized, the respective operating member is moved to apply fluid under pressure to the other end of the respective cylinder and exhaust the one end. At the time that neither of the solenoid coils of the respective valve is energized, the operating member remains in a last position that it was moved to through the energization of one of the solenoid coils of the valve to maintain the fluid connections that were made open the coil was energized.

In using the apparatus of this invention, assuming that it is in the condition at the end of the preceding days operation with no product containing bags on the said apparatus, the hand crank 50 has been turned to move the carrier assembly to the proper elevation for number of layers of arrays of containing bags to be baled, the position of limit switch 354 beneath the stacking platform adjusted, the positions of the spout sections adjusted for the size baler bag being used, and fluid under pressure is applied, switch 326 is closed. Further it is assumed the stacking platform is in its up position for receiving the first layer of bags, at this time the switch members of switches 381 and 257–259 are in the position shown, there being no bags on the collector plates and the ram is in its datum fully retracted position. Now a baler bag is positioned on the spout sections and switch 504 closed whereby coil 505 is energized to move the operating member (not shown) of valve 506 to apply air under pressure to the upper end of cylinder 192 and the lower end of cylinders 196 and exhaust the opposite ends. This moves sections 186 to the position shown in FIG. 4 and the feet of cylinder 196 to clamp baler bag on the spout sections. The resulting movement of arm 191 closes switch 386, it being noted that switch 387 is still open.

To be mentioned is that there is provided a conventional lane feeder that automatically conveys a plurality of bags, one behind the other, and switches the feed to first to feed one bag to the first lane, then the second bag to the second lane, and a third bag to the third lane; and thereafter again feed the next oncoming bag to the first lane and so forth. Now, upon manually depressing the start switch 405, switch member 406 through the closed switch member 380 provides a circuit for energizing the starter relay 414, the energization of the starter relay resulting in switch member 413 moving to its closed position to complete a circuit for energizing the feed roller motor 210. The closing of the switch member 406 does not affect valve members 383, 398 and 498 since limit switch 392 is in open condition, sensing switches 257, 258 and 259 are in the condition illustrated in the drawings (it being assumed that there are no product containing bags on the collection plates), and limit switch 500 is in an open condition (it being assumed that collector plates are in a closed condition). The closing of the start switch 405 through switch member 407 completes a circuit to energize coil 451 of the stacking platform relay that through movement of switch member 454 to a closed position provides a hold in circuit to maintain relay 450 energized as long as switch member 448 is in a closed condition. Since the collector plates are in a closed condition, limit switch 480 is in open condition and accordingly relay 465 is de-energized whereby the feet of cylinder 248, 249, 250 are retracted.

Assume now that the first product containing bag in a flat condition in lane A, is moved by the conveyor belt onto the transfer plate to a position to be engaged by feed roller 214 the bag being of a length such that one portion thereof is abutted by the feed roller 214 while the opposite end is still being moved rearwardly by the conveyor belt 60. Due to the rotation of the feed roller, which has a greater linear velocity than the velocity of the bag being moved by the conveyor belt, the feed roller imparts a sufficient force on the bag to move it rearwardly to approximately half way across the collector plate and out of contact with the feed wheel. When the next product containing bag in the same lane comes in contact with feed roller 214, the feed roller 214 moves the second bag with sufficient force that it moves the bag that is already on the collector plate in the same lane rearwardly to abut against plate 260 and move rod 263 of sensing switch 257 to a position that switch members 460, 501 are closed. In this connection it is being assumed that the collector plates are of longitudinal dimensions to have two product containing bags in lengthwise end to end abutting relationship in each lane. Upon switch member 501 closing, there is completed a circuit for energizing valve 483 that results in air under pressure being applied to the upper end cylinder 248 whereupon its foot moves downwardly to force the clamping plate 240 extending therebeneath to a position that the next oncoming bag in lane A cannot be moved rearwardly a sufficient distance to come in contact with the feed roller 214. The greater linear velocity of the feed roller separates two bags if they are in end to end engagement on the conveyor belt whereby the next oncoming bag is stopped prior to engaging the feed roller.

Likewise, after there are two bags on the collector plates in the second lane B, the sensing switch 258 is moved to close its switch members 461, 462. In closing, the switch member 462 completes a circuit for energizing valve 485 whereupon the clamp plate 240 extending beneath cylinder 249 is moved to prevent the oncoming bag in lane B engaging feed roller 215. Similarly, after there are two bags on the collector plate in the third lane C, the sensing switch 459 is operated to close switch members 493, 495 and to open switch member 494. The closing of the switch member 493 completes a circuit to energize valve 487 whereupon the foot of the cylinder 250 is moved down to force the clamp plates therebeneath to prevent the oncoming bag on the conveyor being moved rearwardly to engage the feed roller 216. The opening of switch member 494 de-energizers coil 499 if energized, and prevents said coil being energized until it is again closed. Since switch member 496 is closed (the ram being in a datum position), the closing of switch member 495 completes a circuit for energizing coil 497 whereby the operating member (not shown) of valve 498 is moved to apply air under pressure to line 120a of cylinder 120 and exhaust air from line 120b. This results in the collector plate arms being moved to translate the collector plates 88, 89 to a spread apart condition. Since the product containing bags between lane plates 90b, 90c (lane B) are in part on each collector plate and the plates move at the same rate, as soon as the collector plates move sufficiently apart, these bags drop directly downwardly. However, for example, with reference to the bag supported by collector plate 88 between lane plates 90a, 90b, the collector plate moves from under the portion of the bag adjacent lane plate 90b and subsequently from under the portion more closely adjacent lane plate 90a. This would result in the bags between lane plates 90a, 90b tending to rotate in a clockwise direction as viewed in FIG. 3; however, due to the provision of the flange guide plate 100, such tendency to rotate is retarded sufficiently that the bags between lane plates 90a, 90b drop generally directly downwardly with a minimum of twisting motion. Likewise, the flange plate 101 serves the same purpose for the bags on the collector plate 89 between the lane plates 90c, 90d. Thus, the bags on the collector plates descend onto a stacking platform in generally the same arrayed condition as they were on the collector plates; and in descending toward the stacking platform, break the beam of light of the electric eye unit 433. This results in the photo unit 433 operating switch member 439 to an open condition whereby the collector plate close coil 499 cannot be energized, switch member 438 to an open condition to de-energize the collector plate open coil and switch member 436 to a closed condition to energize the solenoid coil 429 of lock valve 430. Energizing valve 430 provides an open fluid path for flow of oil from the lower part of the oil portion of cylinder 130 through line 130b, through valve 430 and then through line 130a to the upper part, and since air under pressure is being applied through line 130c to the upper end of the air portion of cylinder 130, the stacking platform 126 moves downwardly. As the stacking platform with the first layer of bags thereon moves from its up position, it operates switch member 395 to move switch member 400 from a closed position to an open position to de-energize the stacking platform down coil 399 and operates the stacking plate limit switch 403 to a closed position. Upon the array of bags on the stacking platform being moved to a lower elevation than the beam of light, the beam of light is re-established and thereupon switch member 436 moves to an open position to de-energize valve 430. The de-energization of valve 430 blocks the flow of oil from one part of the cylinder 130 to the opposite end, and as a result the stacking platform is retained at an elevation that the top surface's layer of bags thereon is at a lower elevation than the collector plates by a dimension slightly greater than the thickness of the layer of bags.

During the period of time that the bags descend from the level of the collector plates to the level of the stacking platform, said bags move out of contact with the sensing switches 257–259 and as a result the switch members 460, 501, 461, 462 495 and 493 move to an open condition. However, as the collector plates move to an open condition, one of the collector plate arms operate lane feed switch 480 to a closed position and thereby energizing relay 465. The energizing of relay takes place before switch members 462, 493, 501 open and thus valves 483, 485, 487 remain energized. Further, at the time that the collector plates have moved to the maximum spread apart position, one of the collector plates parallel arms operates switch member 500 to at closed condition while as the bags in lane C descend from the level of the collector plates, switch member 494 closes. Thus, upon the photoelectric unit operating switch member 439 to a closed position, the collector plate solenoid coil 499 is energized whereupon the fluid circuitry to valve 498 applies air under pressure through line 120b of cylinder 120 and exhausts it through line 120a whereby the collector plates are moved to a closed position. It is noted that coil 497 was previously de-energized by the opening of any one of switch members 460, 461, 495. As the collector plates are moved to closed position, switch 500 resiliently returns to an open condition to de-energize coil 498 and thus valve 499 is de-energized.

When the collector plates move adjacent a closed position, switch member 480 resiliently returns to an open condition to de-energize relay 465; and since switch members 462, 493, 480 and 501 are open, the foot members of cylinders 248–250 retracted and the rearward ends of the clamp plate 240 resiliently return to unclamping positions to permit passage of bags therebeneath. Thereupon the oncoming bags on the conveyor again push bags, including any that could not move rearwardly due to being clamped between plates 240 and the transfer plate, into contact with the feed rollers. Product containing bags are again fed onto the collector plates as previously described to fill the lanes on the collector plates and again operate switches 257–259, the photoelectric unit, switches 494, 500 and valves 430, 498 as previously described whereby a second array of layer bags is deposited on the first layer of arrayed bags on the stacking platform and the stacking platform is lowered a distance approximately the thickness of the layer of filled bags. This cycle of operation may be repeated until the desired number of layers of filled bags are on the stacking platform.

At the time the stacking platform is being lowered with the last of the desired layers of bags, the bale compress and tandem cylinder up switch 354 is operated by the lowering movement of the stacking platform to move switch members 355 and 360 to a closed condition and to open switch member 448. The opening of switch member 448 breaks the hold in circuit for relay 450 to de-energize said relay to prevent the collector plate open solenoid being energized; while the closing of switch member 355 energizes coil 356 to apply air under pressure to the lower end of the tandem cylinder 131 and exhaust the upper end through line 131a. The application of air under pressure to the lower end of cylinder 131 results in the cylinder 131 and all the structure thereon being moved upwardly a short distance, for example one inch, which results in the arrayed layers of bags on the stacking platform being compressed between the closed collector plates and the stacking platform in the event the thickness of the layers of bags on the stacking plate is too great for being pushed through the spout sections. At the same time that switch member 355 is closed, the closing of switch member 360 energizes coil 361 to move the operating member (not shown) of valve 362 to a position to apply air under pressure through line 164b to the side plate compress cylinder 164 and connect line 164a to the exhaust. This results in the side plate arms moving the side plates 151, 152 together to compress the bags therebetween in the event that the width of the layer of bags on the stacking plate is too great for being pushed through the spout sections.

At the same time that the stacking platform is moving downwardly with the last of the desired layer of bags on the stacking platform, an actuator (not shown) on one of the guide rods 141 operates limit switch 415 to a closed position, and since switch member 403 is in a closed condition at this time, the locked valve relay 421 is energized. It is to be mentioned that the actuator for limit switch 415 is located high enough so that regardless of whether or not the tandem cylinder is up or down, switch 415 closes just prior to the time the stacking platform moves downwardly with the last of the desired layers thereon sufficiently to the continuity of the beam between members 433b, 433d being re-established. Usually the tandem cylinder is moving upwardly at the time the stacking plate piston rod 129 is moving downwardly. As a result of the lock valve relay being energized, switch member 423 moves to a closed condition to form a hold in circuit while switch member 427 moves to a closed condition to energize lock valve 430, provided it is de-energized. Thus, with the last of the desired layer of bags on the stacking platform, the lock valve relay 421 is energized prior to the time that the photoelectric unit has operated switch member 436 to an open position so that piston rod 129 will bottom in cylinder 130.

As the tandem cylinder has been moved adjacent its up position, the stacking platform is moved away from the bale compress and tandem cylinder up switch 354 whereby switch members 355 and 360 open to de-energize the tandem cylinder up and side plate close solenoid coils. Also switch member 448 is closed but relay 450 is not energized at this time since switch members 401, 407 are open.

At the time the tandem cylinder has moved to its fully up position and the stacking plate piston rod is fully down, the top surface of the stacking plate is at the same or a slightly higher elevation as the lower spout sections; and at the same or a slightly lower elevation than the lower edge of ram plate 274b. Further, the bags on the stacking platform have been compressed, if necessary, sufficiently to pass through the spout sections and into the baler bag.

Upon the tandem cylinder 131 moving to its up condition, an actuator 131b thereon operates limit switch 387 to a closed condition and since a bag is clamped on the spout section switch members 386 is closed. The closing of switch member 387 completes the circuit to energize the ram forward solenoid coil 384 to move the operating member (not shown) of valve 383 to a position that air under pressure is applied through line 271b of the ram cylinder 271 and connect line 271a to the exhaust to move the ram rearwardly. The initial movement of the ram (and its guide rods) rearwardly results in the actuator 282a on the front end of one of the ram guide rods moving out of contact with the bale compress release switch 381 whereupon switch member 388 moves to an open condition, switch member 396 to a closed condition and switch member 496 to an open condition. The movement of the switch member 496 to an open condition prevents the collection plate open solenoid coil 497 being energized until the ram has returned to its datum position. The movement of the ram rearwardly results in the ram guide rod actuator moving past the tandem down cylinder limit switch 392 but the rearward movement does not change the position of switch 392. Next the ram guide rod actuator moves past the limit switch 510, but the rearward movement does not close switch 510. Thence the ram moves sufficiently rearwardly to push the bags off the stacking plate and into the spout section whereby the product receiving bags abut against the bottom wall of the baler bag to exert a force on the product receiving bags that push the product receiving bags and the baler bag which is now moving with the product receiving bags further rearwardly to a position to fall onto the conveyor 279. It is to be noted that the baler bag is not so firmly clamped that this movement is prevented.

At the end of the movement of the ram in a rearward direction, the ram guide rod actuator abuts against the limit switch 374 to move switch member 364 to a closed position to energize the side plate open coil 363, this resulting in air under pressure being applied to line 164a of the side plate cylinder 164 and line 164b being connected to the exhaust whereby the side plates are moved to the datum spread apart condition. At the same time that switch member 364 is moved to the closed condition, switch member 365 is moved to the closed condition to energize the ram reverse solenoid coil 382 whereupon the operating member (not shown) of valve 383 moves to apply air under pressure to line 271a of the ram cylinder and to exhaust the opposite end of the cylinder through line 271b. This results in the ram moving forwardly together with the ram guide rod actuator moving out of contact with the ram reverse limit switch which results in switch members 364, 365 moving to an open condition. The continuance of forward movement of the ram results in the ram rod actuator being moved to close switch 510 to energize coil 507 and thereafter moving to permit switch 510 resiliently returning to an open condition. This results in air under pressure being applied to the lower end of cylinder 192 and the upper end of cylinder 196 and the opposite ends of said cylinders being exhausted whereby the feet 196a move away from section 194 and sections 186 are pivoted in a counterclockwise direction as viewed in FIG. 1. The mechanism pivoting these sections in this manner opens switch 386.

The continued rearward movement of the ram results in the guide rod actuator moving to a position to contact the tandem cylinder down limit switch 392, and at this time move the limit switch 392 to a closed position. This completes the circuit to energize the stacking platform up solenoid coil 397 and move the operating member of valve 398 to a position that air under pressure is applied through line 130d to the lower end of the pneumatic portion of cylinder 130 and connect the upper end through line 130c to an exhaust. In this connection, it is to be mentioned that at the time the stacking plate up solenoid coil is energized, the entire ram is forwardly of the stacking plate. The continuing forward movement of the guide rod moves its actuator out of contact with switch 392 whereupon switch 392 resiliently returns to an open condition.

Additionally, at the time switch member 392 is closed, it provides a circuit to energize the tandem cylinder down solenoid coil 358 whereby the operating member of valve 357 is moved to a position that air is exhausted from the lower end of cylinder 131 and air under pressure is applied through line 131a to the upper end of said cylinder. The downward movement of the tandem cylinder 131 moves its actuator to a position that limit switch 387 resiliently returns to an open position. Thus, the ram forward cylinder coil cannot be re-energized until all three of limit switches 386–388 are closed.

The return of the ram to a datum position results in switch member 388 being moved to a closed position, switch member 396 to an open condition and switch member 496 to a closed condition whereby the collector plate open solenoid coil 497 may again be energized if limit switches 257–259 have been closed and switch member 457 has been moved to a closed condition. However, switch member 457 is presently in an open condition.

Upon the stacking platform being moved to its up position for receiving the first layer of bags, it operates the stacking plate down limit switch 395 to move switch member 403 to an open position whereby relay 421 and valve 430 are de-energized. Accordingly, the lock valve prevents the flow of hydraulic fluid therethrough and the stacking plate is locked in this elevated position. At the same time switch member 403 is open, switch member 401 closes to energize relay 450 and then switch member 401 opens, the energization of relay 450 closing the hold in circuit switch member 454 and closing switch member 457 whereby a circuit is completed to energize the collector plate open solenoid coil 497, provided there are a sufficient number of bags on the collector plates to operate the lane sensing switches 257–259 to again start the cycle that was described subsequent to the closing of the start switch 405. That is, at this time relay 450 automatically performs the functions that were achieved by the initial pushing to the start button 405. Also, when switch member 401 was closed and switch member 403 opened, switch member 400 is closed to energize the stacking plate solenoid coil 399 to move the operating member of valve 398 to a position that air under pressure is applied to the upper end of the pneumatic cylinder portion of cylinder 130 and exhaust the lower end. However, this application of air under pressure does not result in the stacking plate moving downwardly since prior to the application of air under pressure the lock valve through the de-energization of coil 429 prevents the flow of hydraulic fluid therethrough.

Also to be noted is that prior to the time the ram forward solenoid coil can be energized a second time, switch 504 has to be manually closed to operate piston cylinder combinations 192, 196 to clamp a baler bag on its spout sections.

In the event a different number of layers of arrayed bags or bags of different thicknesses are to be baled, then the hand crank is turned to vary the elevation of the collector plate and other structure on the carrier assembly and the bale compress and tandem up cylinder switch actuator is moved. Also, the hand crank for the upper spout sections is rotated a proper amount and, if necessary, the light emitting and light receiving portions of the photoelectric unit adjusted in vertical elevation relative the side plates, and the position of limit switch 354 varied.

Through the provision of the apparatus of this invention, a plurality of first bags, preferably of conventional plastic material, containing product such as powdered sugar, shelled popcorn, flour and etc. may be readily loaded in an arrayed condition into a baler bag. Such first bags usually are of dimensions that the length dimension is substantially greater than the width dimension and the width thickness dimension substantially smaller than the width dimension. Accordingly it is preferred that the first bags be fed rearwardly with the length dimension extending horizontally transverse to the direction of feed and the thickness dimension being vertical. Thus on the stacking platform, a layer of first bags are deposited on one another with their thickness dimensions being vertical.

What is claimed is:

1. In apparatus for loading a plurality of first product containers into a larger container comprising a frame, a stacking platform, first means for mounting the stacking platform on the frame, a collector plate, second means mounted on the frame for mounting and transversely moving the collector plate between a first position datum position vertically above the stacking platform a second position horizontally spaced from the first position and vertically offset from the stacking platform, a pair of longitudinally extending, transversely spaced lane dividers mounted on the frame in overhanging relationship to the collector plate in its first position to block any substantial transverse movement of the first containers on the collector plate therewith, and third means for feeding the desired number of first containers between the lane dividers onto the collector plate in end to end abutting relationship and thereafter move the collector plate from its first position to its second position to drop said desired number of first containers onto the stacking platform.

2. The apparatus of claim 1 further characterized in that the third means includes fourth means for blocking the feed of first containers onto the collector plate after the desired number is thereon and until after the collector plate has moved from its first position to its second position and back to its first position, and thence feed a second desired number of first containers in end to end abutting relationship onto the collector plate and thereafter block further feeding of first containers onto the collector plate.

3. The apparatus of claim 2 further characterized in that the collector plate has a first transverse edge and an opposite second transverse edge that is horizontally spaced from the first edge by a distance greater than the corresponding dimension of two of the first containers in end to end abutting relationship, and that the fourth means includes fifth means for feeding one first container onto the collector plate toward the second edge to a position substantially spaced from and intermediate said first and second edges and for feeding at least one additional first container to move the said one first container to a position adjacent the second edge, and sixth means for moving containers to the fifth means to be fed thereby and alternately to block movement of first containers to the fifth means.

4. The apparatus of claim 3 further characterized in that the fourth means includes a sensing switch on the frame that is operated from a first condition to a second condition by a first container adjacent the second edge and seventh means actuated by the sensing switch in its second condition to operate the sixth means to its blocking condition.

5. The apparatus of claim 2 further characterized in that the first means includes fifth means for moving the stacking platform vertically betwen a datum first position that is vertically spaced from the collector plate by a dimension that is at least twice the corresponding vertical dimension of a first container on the collector plate and a second position substantially more closely adjacent the collector plate and sixth means for operating the fifth means for moving the stacking platform downwardly from its second position by a dimension approximately equal to the vertical dimension the first container extends above the collector plate after the collector plate moves from its first position and drops a first container.

6. The apparatus of claim 5 further characterized in that there is provided ram means that in a vertical direction is vertically between the collector plate and the stacking platform in a datum position for moving the containers off the platform after the desired number of first containers are on the platform and the platform is in its datum position.

7. The apparatus of claim 6 further characterized in that there is provided seventh means acting in cooperation with the third and sixth means for operating the fifth means to move the stacking platform upwardly a limited amount to vertically compress the first containers if the first containers extend through a vertical dimension greater than a selected vertical dimension after the desired number of first containers are on the stacking platform and the collector plate is in its first position and prior to the ram means moving the first containers off the platform.

8. The apparatus of claim 7 further characterized in that there is provided a pair of side plates, eighth means for mounting the side plates on the frame and moving the side plates transverse to direction of movement of the ram means between a spread apart first position and a second position to horizontally compress the containers on the platform and ninth means for operating the eighth means to move the side plates from their first position to their second position after the desired number of first containers are on the stacking platform and prior to the ram means moving the first containers off the platform.

9. In apparatus for loading a plurality of product containing first bags into a baler second bag, a longitudinally elongated frame, stacking platform means for receiving and supporting a plurality of first bags, first means for mounting the stacking platform means on the frame and moving the platform means between a datum elevation and at least one position at a higher elevation than its datum elevation, a pair of collector plates having first edges, second means for mounting the collector plates in a generally horizontal condition and translating the collector plates transversely in opposite directions between a datum, generally edge abutting first position vertically above the stacking platform means and a second spread apart position that the edges are transversely spread a distance greater than the corresponding dimension of an array of first bags on the collector plates in the collector plate first position, several longitudinally extending lane dividers above and adjacent the collector plates in their first position in transverse spaced relationship to provide a plurality of longitudinally extending lanes and block any substantial transverse movement of the first bags with the collector plates as the collector plates are moved transversely toward their second position whereby the first bags on the collector plates descend toward the stacking platform means as the collector plates move toward their second position, third means for feeding first bags in each lane onto at least one of the collector plates and selectively blocking the feeding of additional bags in the respective lane to the at least one collector plate, fourth means for mounting the lane dividers and the second and third means on the frame, ram means mounted on the frame for movement from a datum position horizontally on one side of the platform means to a second position on the opposite side of the platform means to push arrayed first bags on the platform means off the platform means, and control means for operating the third means to feed the desired number of first bags in each lane onto the collector plates when the collector plates are in their first position, and after the desired number has been fed onto a collector plate, block further feeding in the respective lane until the collector plates have been moved from their first position to their second position and back to their first position to obtain the desired array of first bags on the collector plates, actuate the second means to move the collector plates from their first position to their second position after the desired array of first bags is thereon, and operate the ram means from its first position to its second position and then back to its first position after the collector plates have moved from their first position to their second position.

10. The apparatus of claim 9 further characterized in that the control means includes fifth means to automatically operate the first means to move the stacking platform means upwardly to an elevated position substantially more closely adjacent the collector plates than the platform means datum position after the ram means returns to its second position and to move the stacking platform means from its elevated position toward its datum position by a dimension approximately the vertical dimension of a first bag on at least one of the collector plates after a layer of first bags has descended toward the stacking platform means as a result of the collector plates with an array of first bags thereon moving from its first to its second position.

11. The apparatus of claim 10 further characterized in that the fifth means includes sixth means for operating the third means to feed a second desired array of first bags onto the collector plates subsequent to the collector plates having returned from their second position to their first position after having deposited the first mentioned array of first bags on the stacking platform, then after the second array of first bags is on the collector plates block further feeding of first bags onto the collector plates, and upon the second array being on the collector plates, operate the second means to move the collector plates toward their second position to deposit the second array on the array that is on the stacking platform means.

12. The apparatus of claim 9 further characterized in that the third means includes fifth means for conveying first bags rearwardly toward the collector plates, sixth means for receiving first bags from the fifth means and transferring the received bags to the collector plates and alternately blocking the movement of first bags from the fifth means to the collector plates, and a plurality of second lane dividers mounted to provide the same number of second lanes over at least part of the fifth and six means as the number of lanes over the collector plates, said fifth means including a transfer plate mounted on the fourth means, a feed roller in each second lane, means for mounting the feed rollers on the fourth means in the respective second lane in overhanging relationship to the transfer plate and to drive said rollers in a direction to move a first bag toward the collector plates, and seventh means for each second lane mounted on the fourth means for movement between a first position to block movement of first bags from the fifth means to a position abuttable against the feed rollers in the respective second lane and alternately to a second position permitting movement of the first bags from the fifth means to the collector plates.

13. The apparatus of claim 12 further characterized in that the control means includes means for retaining the seventh means in its second position when the collector plates are out of their first position and to operate the respective seventh means to its blocking position when the respective lane over at least one of the collector plates has the desired number of first bags on at least one of the collector plates in the last mentioned lane, and upon the collector plates moving from their first position to their second position and back toward their second position operate the seventh means to their first position.

14. The apparatus of claim 12 further characterized in that the fifth means comprises an elongated conveyor having a first end portion mounted on the frame for limited movement and a second end portion, that the frame has a pair of upwardly extending carrier assembly mounting members, and that the fourth means comprises a carrier assembly mounted on said mounting members for limited vertical movement and means connected to the carrier assembly mounting members and the carrier assembly to selectively vary the elevation of the carrier assembly relative to the frame, said conveyor second end portion being mounted on the carrier assembly to move therewith.

15. The apparatus of claim 9 further characterized in that the control means includes fifth means for automatically operating the first means to move the stacking platform means upwardly to an elevated position substantially more closely adjacent the collector plates than the platform means datum position, sixth means to automatically operate the first means to move the platform means downwardly from the last mentioned elevated position toward the platform means datum position by a dimension approximately the vertical dimension of a first bag on at least one of the collector plates each time the collector plates moves from their first position to their second position to drop the first bags thereon to fall toward the stacking platform means and upon the stacking platform means moving downward by approximately said dimension, stop downward movement of the stacking platform means, operate the second means to move the collector plates to their first position and operate the third means to feed first bags onto the collector plates in each lane after the collector plates are in their first position until the selected number of first bags is on the collector plate in each lane and then block further feeding until the collector plates have moved to their second position and returned to their first position.

16. The apparatus of claim 15 further characterized in that the control means includes seventh means cooperating with the sixth means to return the stacking platform means to its datum position when the desired number of layers of arrays of first bags are on said platform means and to retain the second means in a condition that the collector plates upon returning to their first position remain in their first position until the ram means has moved from its first to its second and back adjacent its first position and eighth means operated by the first means returning the stacking platform means to its datum position to operate the ram means to move from its first to its second position.

17. The apparatus of claim 16 further characterized in that the stacking platform means includes a stacking platform having opposed side edges and ninth means for moving the stacking platform between the platform means datum and elevated positions, that there is provided a pair of side plates to extend vertically from adjacent the collector plates to adjacent the stacking platform in its datum position, tenth means for mounting the side plates to extend along either side edge of the stacking platform and moving the side plates transverse to the path of movement of the ram means between a datum first position and a second more closely adjacent first bag compress position, and that the seventh means includes means for operating the side plates to their second position prior to the ram means moving from its first to its second position.

18. The apparatus of claim 17 further characterized in that the stacking platform means includes an extension slideably mounted on stacking platform for transverse movement to extend between the stacking platform and the adjacent side plate and means for resiliently urging each extension to remain in abutting relationship with the adjacent side plate.

19. In apparatus for loading a plurality of first product containers into a larger container comprising a frame, a generally horizontal stacking platform, a vertical first piston cylinder combination having a cylinder that has an oil portion and an air portion, a piston rod connected to the stacking platform, a first piston mounted on said rod in the oil portion, and a second piston mounted on said rod in said air portion, first means for mounting said combination on the frame, movable second means mounted on the frame for in a first position receiving a layer of first containers and in a second position dropping the received layer of first containers over said platform, third means for supply air under pressure to said air portion to selectively move the second piston in either vertical direction, valve means connected to the oil portion to block flow of oil from one side of the oil portion piston to the other to block movement of the piston rod and alternately permitting the free flow of oil to permit the piston rod moving, and control means for operating the valve means to permit the free flow of oil and the third means to apply air under pressure to the air portion to move the air portion piston from a platform datum position to a platform elevated position, then the valve means to block oil flow, thence the third means to apply air under pressure to the air portion for moving the air portion cylinder downwardly and thereafter operate the second means a number of times from a first container receiving position to a container dropping position and back to a first container receiving position, and each time the second means moves to its first position dropping first container, operate the valve means to permit the flow of oil until the platform has moved downwardly a distance approximately the same that the first container on the first means extends above the first means.

20. The apparatus of claim 19 further characterized in that the second means includes a collector plate and fourth means mounted on the frame for mounting the collector plate and moving the collector plate between a first horizontally extending position above the stacking platform to receive first containers and a second product dropped position.

21. The apparatus of claim 20 further characterized in that the first means comprises a vertical second piston cylinder combination having a piston rod secured to the frame and a second cylinder attached to first combination to move said first combination as said second cylinder moves, and that said control means includes means to apply fluid under pressure to said second cylinder to move it upwardly a substantial distance after the platform has moved downwardly the desired number of times to have received a selected number of layers of first containers and the collector plate has moved from its second position to adjacent its first position to permit compressing the first container between the platform and the collector plate.

22. The apparatus of claim 21 further characterized in that there is provided movable ram means mounted on the frame to push the first containers off the platform and that the control means includes means operated through the second cylinder moving upwardly to actuate the ram means to push the first containers off the platform.

23. Apparatus for loading product containing bags comprising an elongated frame, a stacking platform, first means for mounting the stacking platform on the frame and moving the platform between a datum elevation and at least one position at a higher elevation than the datum elevation, second means for supporting product containing bags in an arrayed condition and alternately moving to deposit product containing bags in an arrayed condition on the stacking platform, third means for mounting the second means and moving the second means between a bag receiving datum position and a second position to deposit bags in a generally arrayed condition on the stacking platform, fourth means cooperating with second means to aid in retaining the bags on the second means in generally the same relative relationship as the second means moves from its datum position to facilitate the depositing of the product receiving bags in an arrayed condition on the stacking platform, fifth means for conveying product containing bags rearwardly and transferring product containing bags onto the second means in an arrayed condition, sixth means mounted on the frame for mounting the third means, fourth means and fifth means, seventh means on the frame for supporting a baler bag in a position to receive arrayed bags from the stacking platform, ram means mounted on the frame for moving arrayed bags off the stacking platform when it is in a datum position and into a baler bag supported by the seventh means, and control means for operating the fifth means to transfer a preselected number of product containing bags onto the second means when it is in a datum position, then operate the third means to move the second means to its second position, subsequently move the stacking platform to its datum position if the stacking platform is out of its datum position and thereafter operate the ram means to move the product containing bags into the baler bag on the seventh means.

24. The apparatus of claim 23 further characterized in that the control means includes means to operate the third and fifth means through a preselected number of cycles to deposit a preselected number of layers of arrayed bags on the stacking platform prior to operating the ram means to move the bags off the stacking platform onto the baler bag.

25. The apparatus of claim 24 further characterized in that the control means includes means for lowering the stacking platform toward the datum elevation about the vertical dimension of a bag on the second means after the second means has been moved to its second position and prior to the third means moving the second means from its second position to its datum position.

26. The apparatus of claim 24 further characterized in that the second means comprises a pair of generally horizontal collector plates to receive product containing bags from the fifth means, that the third means comprises eighth means mounted on the sixth means for translating the collector plates between a datum position and a spread apart position to permit a product containing bag to drop therebetween.

27. The apparatus of claim 26 further characterized in that the eighth means comprises means for moving the collector plates generally transversely relative the direction of movement of product containing bags onto the collector plates, and that the fourth means includes a pair of elongated parallel plates and means for mounting said plates in overshanging relationship and closely adjacent the collector plates in a datum position, and extending generally parallel to the direction of movement of a product containing bag onto the collector plates on either side of the last mentioned bag, the last mentioned means mounting the lane plates to extend sufficiently close to the collector plates to block any substantial movement of the bag on the collector plates in the same direction as the collector plates are moved to their spread apart condition.

28. The apparatus of claim 23 further characterized in that the sixth means comprises eighth means for mounting the third means in a position to support the second means in overlying relationship to the stacking platform when the second means is in its first position.

29. The apparatus of claim 28 further characterized in that the second means comprises first and second generally horizontal collector plates having adjacent edges and that the third means comprises means for translating the collector plates in opposite directions, transverse to the direction a bag is moved in being transferred onto the second means by the fifth means, between a datum first position the adjacent edges are sufficiently closely adjacent that a product containing bag is supported by the collector plates and a second position that the adjacent edges are sufficiently spaced to permit bags on the collector plates dropping therebetween in the same relative relationship as the product containing bags are supported on the collector plates.

30. The apparatus of claim 29 further characterized in that there is provided a pair of vertical side plates of at least a vertical dimension to extend from adjacent the under surface of a collector plate to the elevation of the stacking platform at its datum elevation, ninth means for mounting the side plates to extend on either side of the stacking platform generally parallel to the direction of the movement of the ram and transversely moving the side plates between a datum spread apart condition and a second condition more closely adjacent one another and that the control means includes means for operating the ninth means to move the side plates to their second condition after a layer of bags is on the stacking platform and prior to the ram means moving the arrayed bags off the stacking platform.

31. The apparatus of claim 30 further characterized in that the stacking platform comprising a horizontal stacking platform having opposed edge portions extending parallel to the side plates, a stacking plate extension for each edge portion transversely slidably retained on the stacking plate to extend between the stacking platform and the adjacent side plate in each of the side plate positions, and means for resiliently retaining each extension in abutting relationship with the respective adjacent side plate.

32. The apparatus of claim 29 further characterized in that the control means includes means for automatically operating the first means to move the stacking platform vertically downwardly a distance about the same distance that product containing bags extend above the collector plates when located on the collector plates after the collector plates have moved toward their second position to deposit bags on the stacking platform and prior to collector plates returning to their first position.

33. The apparatus of claim 32 further characterized in that the control means includes ninth means for automatically operating the first means to move the stacking platform to its datum position after the collector plates have deposited a selected number of layers of generally arrayed bags on the stacking plaftorm and thereafter operated the ram means to move the arrayed bags on the stacking platform into the baler bag on the seventh means and means operated by the stacking platform moving downwardly at least a selected dimension for actauting the ninth means to operate the first means.

34. The apparatus of claim 33 further characterized in that the first means includes a vertical first piston cylinder combination having a first cylinder and a first piston rod attached to the stacking platform and a second vertical piston cylinder combination having a second piston rod fixedly attached to the frame and a second cylinder mounting the first cylinder to extend thereabove, and that the ninth means comprises means for controlling the flow of fluid under pressure to and from the first cylinder and means for controlling the flow of fluid under pressure to and from the second cylinder.

35. The apparatus of claim 33 further characterized in that fifth means comprises elongated tenth means having a front end portion and a rear end portion for conveying product containing bags rearwardly toward the collector plates, and operable eleventh means between the collector plates and the tenth means for transferring product containing bags from the tenth means to the collector plates and alternately blocking movement of product containing bags from the tenth means to the collector plates, and that the control means includes means for operating the eleventh means to its blocking condition after the desired array of product containing bags are on the collector plates and retaining the eleventh means in its blocking condition until the collector plates have returned to their datum position.

36. The apparatus of claim 35 further characterized in that the eleventh means comprises a transfer plate mounted by the sixth means intermediate the collector plates and the rearward end portion of the tenth means to have product containing bags slide thereover, a feed roller above the transfer plate for moving a bag on the transfer plate onto at least one of the collector plates, means mounted by the sixth means to mount and continuously rotate the feed roller in a direction to move an adjacent product containing bag from the transfer plate toward the collector plates, and operable twelfth means mounted by the fifth means for movement between a first position permitting a product containing bag moving off the tenth means and onto the transfer plate for engagement by the feed roller and alternately cooperating with the transfer plate to block movement of a product containing bag off the tenth means to a position to be engaged by the feed roller.

37. The apparatus of claim 36 further characterized in that the fourth means comprising a plurality of lane dividers mounted on the sixth means in overhanging relationship to the transfer plate and the collector plates to provide a plurality of lanes, that the aforementioned feed roller and the twelfth means is provided in one lane and that the eleventh means comprises another feed roller and twelfth means in each of the other lanes.

38. The apparatus of claim 37 further characterized in that the means for operating the eleventh means includes means for operating each of the twelfth means to its blocking position just after a selected number of product receiving bags is on at least one of the collector plates in the respective lane.

39. The apparatus of claim 38 further characterized in that each twelfth means includes a flexible metal plate having a forward end portion and a rearward end portion horizontally above the transfer plate and horizontally intermediate the respective feed roller and the tenth means and means mounted on the sixth means for selectively moving at least a portion of the flexible plate downwardly sufficiently close to the transfer plate to block the passage of a product containing bag from the tenth means to the feed roller.

40. The apparatus of claim 38 further characterized in that each of the collector plates, the transfer plate, and the stacking platform has a plurality of fluid passageways fluidly connected to one another and a plurality of apertures opening through the top surface of the respective plate and to the passageways to direct pressurized air upwardly and means for supplying air under pressure to the passageways in said plates.

41. In apparatus for loading a plurality of first product containers into a larger container comprising a frame, a stacking platform, first means for mounting the stacking platform on the frame, a collector plate, second means mounted on the frame for mounting and transversely moving the collector plate between a first position datum position vertically above the stacking platform and a second position horizontally spaced from the first position and vertically offset from the stacking platform, a pair of longitudinally extending, transversely spaced lane dividers mounted on the frame in overhanging relationship to the collector plate in its first position to block any substantial transverse movement of the first containers on the collector plate therewith, and third means for feeding the desired number of first containers between the lane dividers onto the collector plate and thereafter move the collector plate from its first position to its second position to drop said desired number of first containers onto the stacking platform, the third means including a conveyor for conveying product containers toward the collector plate and an airslide transfer plate between the conveyor and the collector plate to have a container moved thereover.

42. The apparatus of claim 41 further characterized in that the third means includes a driven roller mounted on the frame above the transfer plate to upon a container being engaged thereby to force the containerto move at least partially across the collector plate.

43. The apparatus of claim 41 further characterized in that the collector plate has an internal fluid passageway, a plurality of apertures opening through the upper surface of the collector plate and opening to said passageway, and fourth means for applying air under pressure to said passageway.

44. The apparatus of claim 43 further characterized in that said stacking platform has an internal passageway and a plurality of apertures opening to the last mentioned passageway and means for fluidly connecting the platform passageway to the fourth means.

References Cited
UNITED STATES PATENTS

| | | | |
|---|---|---|---|
| 2,783,598 | 3/1957 | Wolven | 53—124X |
| 2,813,638 | 11/1957 | Miller | 214—6 |
| 3,512,336 | 5/1970 | Rosecrans | 53—164 |

THERON E. CONDON, Primary Examiner

R. L. SPRUILL, Assistant Examiner

U.S. Cl. X.R.

53—162, 164, 124, 187; 214—6